US012792006B2

(12) United States Patent
Koide et al.

(10) Patent No.: US 12,792,006 B2
(45) Date of Patent: Nov. 10, 2026

(54) CONTROL DEVICE AND COMPUTER-READABLE STORAGE MEDIUM

(71) Applicant: Fanuc Corporation, Minamitsuru-gun (JP)

(72) Inventors: Naoya Koide, Minamitsuru-gun (JP); Hiroyuki Kawamura, Minamitsuru-gun (JP); Hiroki Murakami, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 255 days.

(21) Appl. No.: 18/834,767

(22) PCT Filed: Feb. 7, 2022

(86) PCT No.: PCT/JP2022/004766
§ 371 (c)(1),
(2) Date: Jul. 31, 2024

(87) PCT Pub. No.: WO2023/148986
PCT Pub. Date: Aug. 10, 2023

(65) Prior Publication Data

US 2025/0123613 A1 Apr. 17, 2025

(51) Int. Cl.
*G05B 19/41* (2006.01)
*B29C 70/38* (2006.01)
(Continued)

(52) U.S. Cl.
CPC ........ *G05B 19/40931* (2013.01); *B29C 70/38* (2013.01); *G05B 19/18* (2013.01); *G05B 2219/49164* (2013.01)

(58) Field of Classification Search
None
See application file for complete search history.

(56) References Cited

U.S. PATENT DOCUMENTS

2007/0150080 A1 * 6/2007 Hagen ...................... B29C 70/38 700/56
2017/0248935 A1 * 8/2017 Koide ................ G05B 19/4103
(Continued)

FOREIGN PATENT DOCUMENTS

CA 2470683 C * 9/2010 ........... B29C 64/118
CA 3142587 A1 * 12/2020 ............. G01N 29/48
(Continued)

OTHER PUBLICATIONS

Bosetti et al., "Feed-rate and trajectory optimization for CNC machine tools", Robotics and Computer-Integrated Manufacturing 30 (2014) 667-677. (Year: 2014).*
(Continued)

*Primary Examiner* — Mohammad Ali
*Assistant Examiner* — Kelvin Booker
(74) *Attorney, Agent, or Firm* — BUCHANAN INGERSOLL & ROONEY PC

(57) ABSTRACT

Provided is a control device including a corner detection unit that detects a command for a corner portion; a command generation unit that generates a curve command path and first command speed information indicating a first provisional feed speed by overlapping a feed speed when a tool moves toward the corner portion and a feed speed when the tool moves away from the corner portion; a second speed planning unit that generates second command speed information indicating a second provisional feed speed; and a command speed generation unit that generates third command speed information indicating an actual feed speed when the tool is to actually move on the curve command path.

8 Claims, 19 Drawing Sheets

(51) Int. Cl.
*G05B 19/18* (2006.01)
*G05B 19/4093* (2006.01)

(56) References Cited

U.S. PATENT DOCUMENTS

| | | | | |
|---|---|---|---|---|
| 2017/0308057 | A1* | 10/2017 | Kreidler | G05B 19/41875 |
| 2020/0401107 | A1* | 12/2020 | Koide | G05B 19/41 |

FOREIGN PATENT DOCUMENTS

| | | | | | |
|---|---|---|---|---|---|
| CN | 101506748 | A | * | 8/2009 | |
| CN | 103984285 | A | * | 8/2014 | |
| CN | 105005265 | A | * | 10/2015 | G05B 19/18 |
| CN | 106444635 | A | * | 2/2017 | G05B 19/41 |
| CN | 106970589 | A | * | 7/2017 | G05B 19/404 |
| CN | 112699563 | A | * | 4/2021 | G06Q 10/0639 |
| DE | 4291618 | C2 | * | 8/2002 | G05B 19/4068 |
| DE | 102018218201 | A1 | * | 5/2019 | G05B 19/4093 |
| JP | H06110534 | A | * | 4/1994 | |
| JP | 08137538 | A | * | 5/1996 | |
| JP | H08123531 | A | * | 5/1996 | |
| JP | H08137538 | A | * | 5/1996 | |
| JP | 2004525467 | A | * | 8/2004 | G05B 19/404 |
| JP | 2010511919 | A | * | 4/2010 | G05B 19/416 |
| WO | WO-2006002305 | A2 | * | 1/2006 | B24B 33/06 |
| WO | 2016024338 | A1 | | 2/2016 | |
| WO | WO-2016082237 | A1 | * | 6/2016 | G05B 19/416 |
| WO | WO-2019047458 | A1 | * | 3/2019 | G05B 19/4163 |

OTHER PUBLICATIONS

YuWen et al., "Jerk-limited feed rate scheduling and optimization for five-axis machining using new piecewise linear programming approach", Sci China Tech Sci, 2019, 62: 1067-1081. (Year: 2019).*

Kombarov et al., "S-Curve Algorithm of Acceleration/Deceleration With Smoothlylimited Jerk in High-Speed Equipment Control Tasks", MM Science Journal, 2019, Special Issue on HSM2019. (Year: 2019).*

Huang et al., "Feed rate scheduling for interpolation of parametric tool path using the sine series representation of jerk profile", Proc IMechE Part B: J Engineering Manufacture 2017, vol. 231(13) 2359-2371. (Year: 2017).*

Beudaert et al., "Feed rate interpolation with axis jerk constraints on 5-axis NURBS and G1 tool path", International Journal of Machine Tools & Manufacture 57 (2012) 73-82. (Year: 2012).*

Int'l Search Report (PCT/ISA/210) w/ translation & Written Opinion (PCT/ISA/237) mailed on Apr. 5, 2022, by the Japanese Patent Office in Int'l App. No. PCT/JP2022/004766. (8 pages).

* cited by examiner

```
          ·
          ·
          ·
N10 G00 X100.0 Y100.0 ;
N11 G01 X150.0 Y100.0 F100.0 ;
N12     X150.0 Y150.0 ;
          ·
          ·
          ·
```

CONTROL DEVICE AND COMPUTER-READABLE STORAGE MEDIUM

CROSS REFERENCE TO RELATED APPLICATIONS

This is the U. S. National Phase application of PCT/JP2022/004766, filed Feb. 7, 2022, the disclosure of this application being incorporated herein by reference in its entirety for all purposes.

FIELD OF THE INVENTION

The present disclosure relates to a control device and a computer readable storage medium.

BACKGROUND OF THE INVENTION

When a corner part of a workpiece is machined by a machine tool, the moving direction of the tool is changed discontinuously. In such a case, large inertia force occurs on respective control axes of the machine tool. Occurrence of large inertia force on respective control axes may cause vibration on respective control axes. To prevent occurrence of vibration, control to continuously change the moving direction of a tool is performed at a corner part. For example, respective control axes are controlled so that a tool moves along a Non-Uniform Rational B-Spline (NURMS) curve. Furthermore, respective control axes are controlled so that a tool moves at a smaller feed rate at a corner part (for example, Patent Literature 1).

PATENT LITERATURE

Patent Literature 1: International Publication No. 2016/024338

SUMMARY OF THE INVENTION

Even when a tool is controlled so as to move at a low rate, however, the inertia force applied to respective control axes increases in a portion around a corner part where the curvature of a curve is larger, and this may adversely affect a machined surface and reduce the quality of the machined surface.

Accordingly, it is desired to improve the quality of the machined surface in machining on a corner part.

A control device includes: a corner detection unit that detects, from a machining program, an instruction on a corner part where a direction of machining performed by a tool is changed discontinuously; a first rate-planning unit that, based on the instruction, generates a deceleration plan defining a feed rate of a control axis when the tool moves toward the corner part and an acceleration plan defining a feed rate of the control axis when the tool moves away from the corner part; an instruction generation unit that overlaps a deceleration period specified by the deceleration plan and an acceleration period specified by the acceleration plan to generate a curve instruction path representing a motion path of the tool and first instruction rate information indicating a first provisional feed rate of the tool on the curve instruction path; a second rate-planning unit that generates second instruction rate information indicating a second provisional feed rate of the tool on the curve instruction path so that an acceleration on the curve instruction path generated by the instruction generation unit is less than or equal to a predetermined allowable acceleration; and an instruction rate generation unit that, based on the first instruction rate information and the second instruction rate information, generates third instruction rate information indicating an actual feed rate when the tool actually moves on the curve instruction path.

A computer readable storage medium stores an instruction that causes a computer to perform: detecting, from a machining program, an instruction on a corner part where a direction of machining performed by a tool is changed discontinuously; based on the instruction, generating a deceleration plan defining a feed rate of a control axis when the tool moves toward the corner part and an acceleration plan defining a feed rate of the control axis when the tool moves away from the corner part; overlapping a deceleration period specified by the deceleration plan and an acceleration period specified by the acceleration plan to generate a curve instruction path representing a motion path of the tool and first instruction rate information indicating a first provisional feed rate of the tool on the curve instruction path; generating second instruction rate information indicating a second provisional feed rate of the tool on the curve instruction path so that an acceleration on the generated curve instruction path is less than or equal to a predetermined allowable acceleration; and based on the first instruction rate information and the second instruction rate information, generating third instruction rate information indicating an actual feed rate when the tool actually moves on the curve instruction path.

According to one aspect of the present disclosure, the quality of the machined surface can be improved in machining on a corner part.

DETAILED DESCRIPTION OF EMBODIMENTS OF THE INVENTION

A control device according to an embodiment of the present disclosure will be described below with reference to the drawings. Note that not all combinations of features described in the following embodiment are necessarily required for achieving the object. Further, more detailed description than is needed may be omitted. Further, the following description of the embodiment and the drawings are provided for those skilled in the art to fully understand the present disclosure and are not intended to limit the scope of the claims.

The control device is a numerical control device that controls a machine tool. The machine tool includes a lathe, a machining center, a drilling center, a multi-tasking machine, a laser beam machine, and a wire electrical discharge machine. In the following, a numerical control device will be described as an example of the control device.

Figure 1:
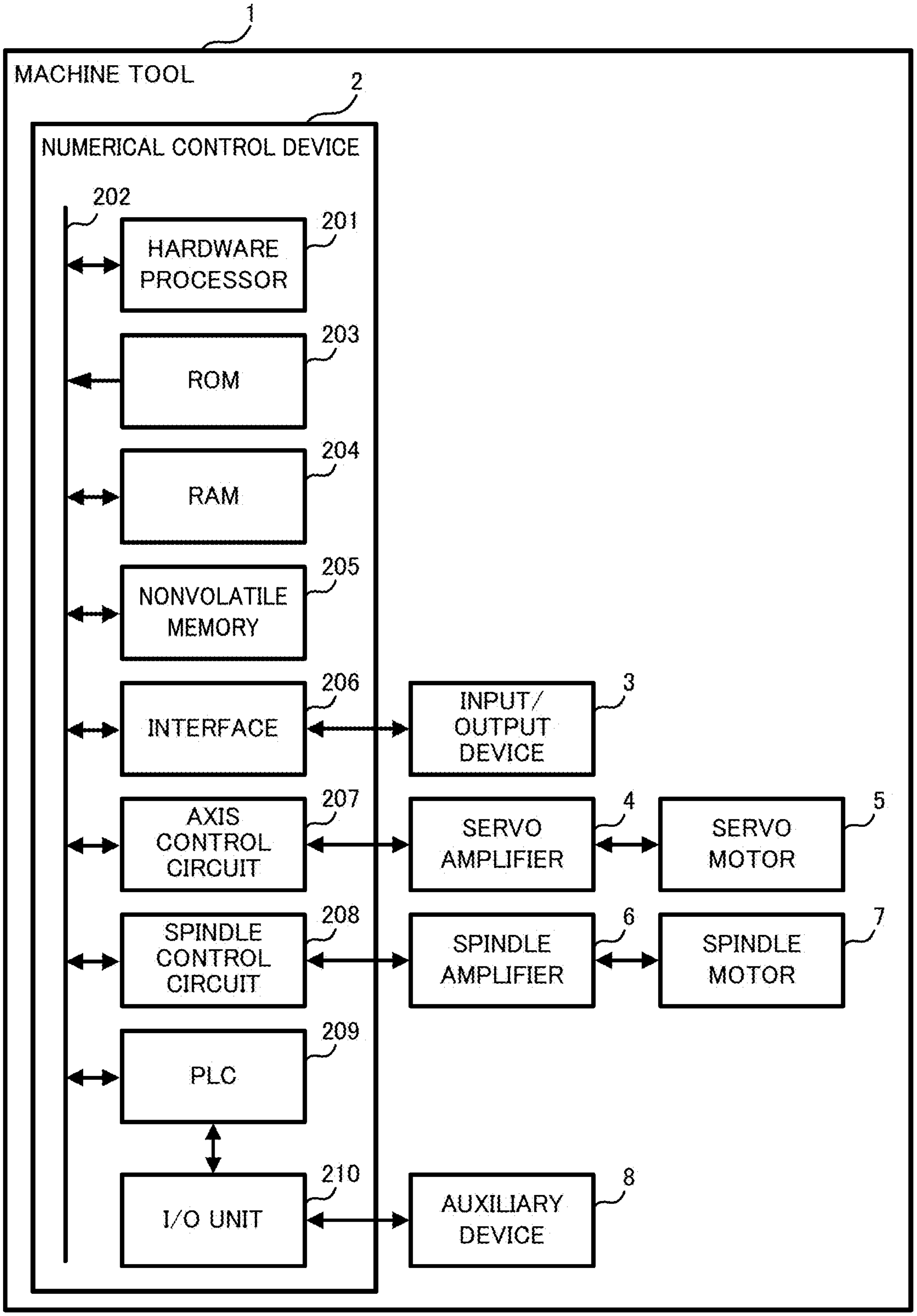
FIG. 1 is a block diagram illustrating an example of a hardware configuration of a machine tool.

FIG. 1 is a block diagram illustrating an example of a hardware configuration of a machine tool including a numerical control device.

A machine tool 1 includes a numerical control device 2, an input/output device 3, a servo amplifier 4, a servo motor 5, a spindle amplifier 6, a spindle motor 7, and an auxiliary device 8.

The numerical control device 2 is a device that controls the entire machine tool 1. The numerical control device 2 includes a hardware processor 201, a bus 202, a read only memory (ROM) 203, a random access memory (RAM) 204, and a nonvolatile memory 205.

The hardware processor 201 is a processor that controls the entire numerical control device 2 in accordance with a system program. The hardware processor 201 reads a system program stored in the ROM 203 via the bus 202 and performs various processes based on the system program. The hardware processor 201 controls the servo motor 5 and the spindle motor 7 based on a machining program. The hardware processor 201 is, for example, a central processing unit (CPU) or an electronic circuit.

The hardware processor 201 performs analysis of a machining program and output of control instructions to the servo motor 5 and the spindle motor 7, for example, at each control cycle.

The bus 202 is a communication path for connecting respective hardware components in the numerical control device 2 to each other. These hardware components in the numerical control device 2 transfer data to each other via the bus 202.

The ROM 203 is a storage device storing a system program for controlling the entire numerical control device 2 or the like. The ROM 203 is a computer readable storage medium.

The RAM 204 is a storage device temporarily storing various data. The RAM 204 functions as a work area for the hardware processor 201 to process various data.

The nonvolatile memory 205 is a storage device that holds data even when the machine tool 1 is powered off and the numerical control device 2 is thus not supplied with power. For example, the nonvolatile memory 205 stores a machining program and various parameters. The nonvolatile memory 205 is a computer readable storage medium. For example, the nonvolatile memory 205 is formed of a memory backed up by a battery or a solid state drive (SSD).

The numerical control device 2 further includes an interface 206, an axis control circuit 207, a spindle control circuit 208, and a programmable logic controller (PLC) 209, and an I/O unit 210.

The interface 206 connects the bus 202 and the input/output device 3 to each other. For example, the interface 206 transmits various data processed by the hardware processor 201 to the input/output device 3.

The input/output device 3 is a device that receives various data via the interface 206 and displays the various data. Further, the input/output device 3 accepts entry of various data and transmits the various data to the hardware processor 201, for example, via the interface 206.

The input/output device 3 is a touch panel, for example. When the input/output device 3 is a touch panel, the input/output device 3 is a capacitive touch panel, for example. Note that the touch panel may be other types of touch panels without being limited to the capacitive type. The input/output device 3 is installed to an operating panel (not illustrated) in which the numerical control device 2 is stored.

The axis control circuit 207 is a circuit that controls the servo motor 5. In response to receiving a control instruction from the hardware processor 201, the axis control circuit 207 outputs an instruction for driving the servo motor 5 to the servo amplifier 4. For example, the axis control circuit 207 transmits a torque command for controlling the torque of the servo motor 5 to the servo amplifier 4.

In response to receiving an instruction from the axis control circuit 207, the servo amplifier 4 supplies current to the servo motor 5.

The servo motor 5 is driven in response to being supplied with current from the servo amplifier 4. The servo motor 5 is connected to a ball screw that drives a tool rest, for example. In response to the servo motor 5 being driven, the structure of the machine tool 1 such as a tool rest moves in each control axis direction. The servo motor 5 has a built-in encoder (not illustrated) that determines the position of the control axis and the feed rate. Position feedback information and rate feedback information indicating the position of the control axis and the feed rate of the control axis, respectively, which are determined by the encoder, are fed back to the axis control circuit 207. Accordingly, the axis control circuit 207 performs feedback control of the control axis.

The spindle control circuit 208 is a circuit for controlling the spindle motor 7. In response to receiving a control instruction from the hardware processor 201, the spindle control circuit 208 transmits an instruction for driving the spindle motor 7 to the spindle amplifier 6. For example, the spindle control circuit 208 transmits a spindle rate command for controlling a rotational rate of the spindle motor 7 to the spindle amplifier 6.

In response to receiving an instruction from the spindle control circuit 208, the spindle amplifier 6 supplies current to the spindle motor 7.

The spindle motor 7 is driven in response to being supplied with current from the spindle amplifier 6. The spindle motor 7 is connected to the spindle and rotates the spindle.

The PLC 209 is a device that executes a ladder program to control the auxiliary device 8. The PLC 209 transmits an instruction to the auxiliary device 8 via the I/O unit 210.

The I/O unit 210 is an interface that connects the PLC 209 and the auxiliary device 8 to each other. The I/O unit 210 transmits an instruction received from the PLC 209 to the auxiliary device 8.

The auxiliary device 8 is a device installed to the machine tool 1 and configured to perform an auxiliary operation in the machine tool 1. The auxiliary device 8 operates based on an instruction received from the I/O unit 210. The auxiliary device 8 may be a device installed in the periphery of the machine tool 1. The auxiliary device 8 is, for example, a tool exchanger, a cutting liquid injector, or an open/closure door drive device.

Next, functions of the numerical control device 2 will be described. The numerical control device 2 controls respective control axes of the machine tool 1 to move at least one of a tool and a workpiece. A workpiece is machined by relative motion of the tool and the workpiece.

Figure 2:
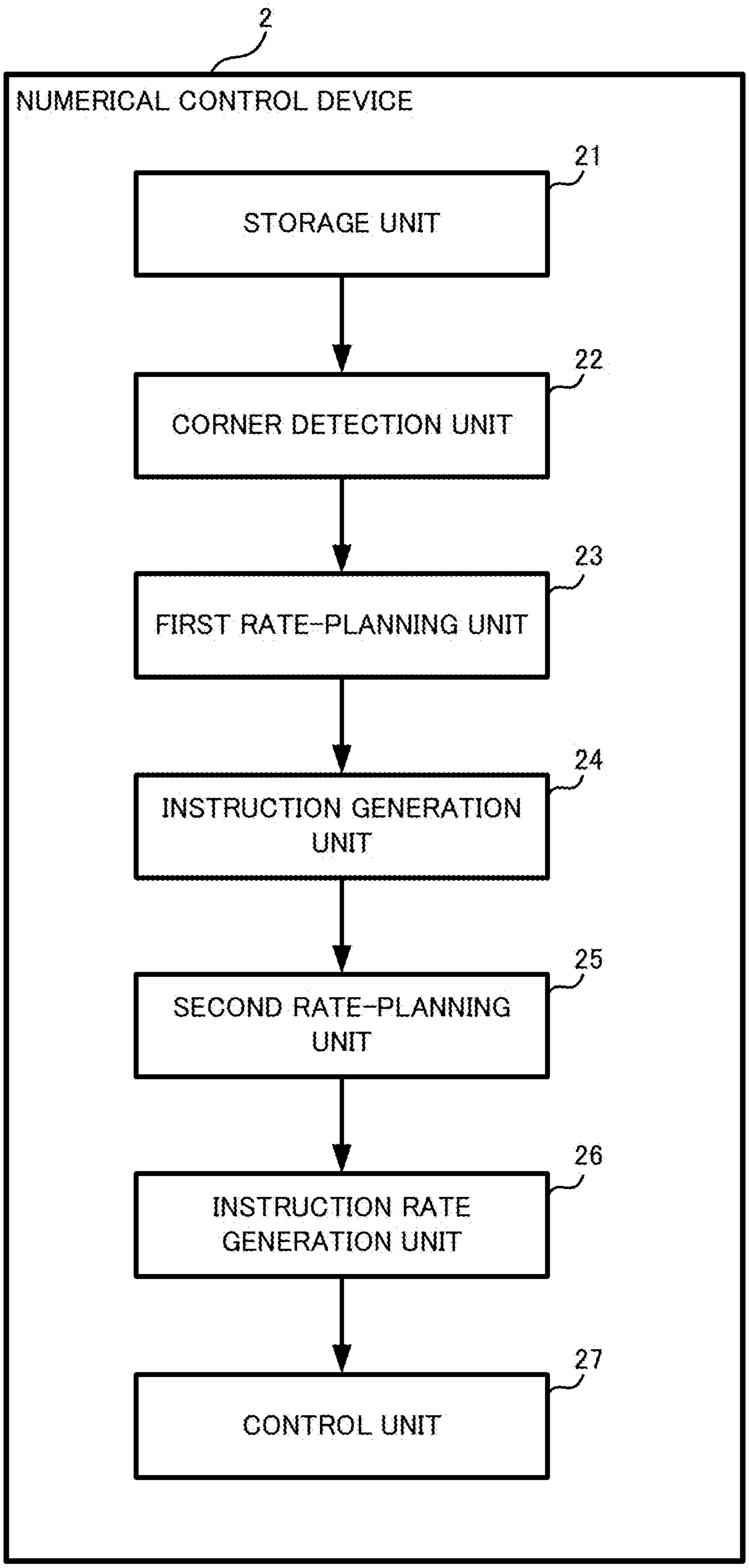
FIG. 2 is a block diagram illustrating an example of functions of a numerical control device.

FIG. 2 is a diagram illustrating an example of functions of the numerical control device 2. The numerical control device 2 includes a storage unit 21, a corner detection unit 22, a first rate-planning unit 23, an instruction generation unit 24, a second rate-planning unit 25, an instruction rate generation unit 26, and a control unit 27.

For example, the storage unit 21 is implemented by various data being stored in the RAM 204 or the nonvolatile memory 205. For example, the corner detection unit 22, the first rate-planning unit 23, the instruction generation unit 24, the second rate-planning unit 25, the instruction rate generation unit 26, and the control unit 27 are implemented when the hardware processor 201 performs computation processing by using a system program stored in the ROM 203 and a machining program and various data stored in the nonvolatile memory 205.

The storage unit 21 stores a machining program. The machining program includes a turning program and a milling program. The machining program includes an instruction used for machining a corner part.

Figures 3, 4:
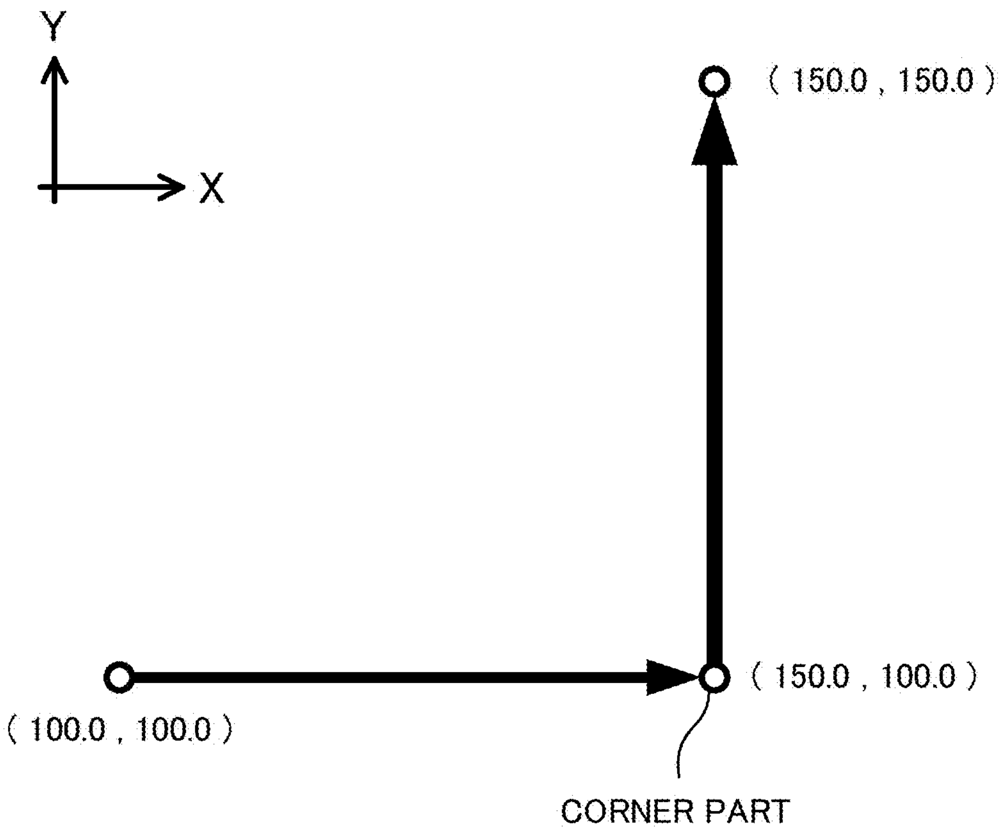
FIG. 3 is a diagram illustrating an example of a machining program.
FIG. 4 is a diagram illustrating an example of a motion path of a tool.

FIG. 3 is a diagram illustrating an example of a machining program including an instruction of machining on a corner part. In the machining program illustrated in FIG. 3, "G00 X100.0 Y100.0;" is written on the line of sequence No. N10. The part "G00" is a positioning instruction. That is, the instruction written on the line of sequence No. N10 is an instruction to position a tool at the position of X100.0, Y100.0.

On the line of sequence No. N11, "G01 X150.0 Y100.0 F100.0;" is written. The part "G01" is a linear interpolation instruction. The part "F100.0" is a feed rate instruction. That is, the instruction written on the line of sequence No. N11 is an instruction to move the tool from the position of X100.0, Y100.0 to the position of X150.0, Y100.0 at a feed rate of 100.0 (mm/min) by cutting feed with linear interpolation. Note that "G01" is a modal instruction. The modal instruction refers to an instruction that is valid until another code included in the same group, such as G00, G02, and G03, is designated.

On the line of sequence No. N12, "X150.0 Y150.0" is written. Since "G01" is the modal instruction, "G01" is a valid instruction on the line of sequence No. N12. Therefore, the instruction written on the line of sequence No. N12 is an instruction to move a tool from the position of X150.0, Y100.0 to the position of X150.0, Y150.0 at a feed rate of 100.0 (mm/min) by cutting feed with linear interpolation.

FIG. 4 is a diagram illustrating an example of the motion path of a tool. The motion path illustrated in FIG. 4 illustrates a motion path of a tool when the machining program illustrated in FIG. 3 is executed.

The corner detection unit 22 detects, from a machining program, an instruction on a corner part where the direction of machining performed by a tool is changed discontinuously. The term "discontinuously" means that, when a function representing a motion path is differentiated, differential values are discontinuous, for example. The corner part is a portion where straight or curved motion paths intersect at a right angle, an acute angle, or an obtuse angle, for example. Once the machining program illustrated in FIG. 3 is loaded, the corner detection unit 22 detects the corner part illustrated in FIG. 4.

Based on an instruction on a corner part, the first rate-planning unit 23 generates a deceleration plan, which defines a feed rate of a control axis when the tool moves toward the corner part, and an acceleration plan, which defines a feed rate of the control axis when the tool moves away from the corner part.

Figure 5A:
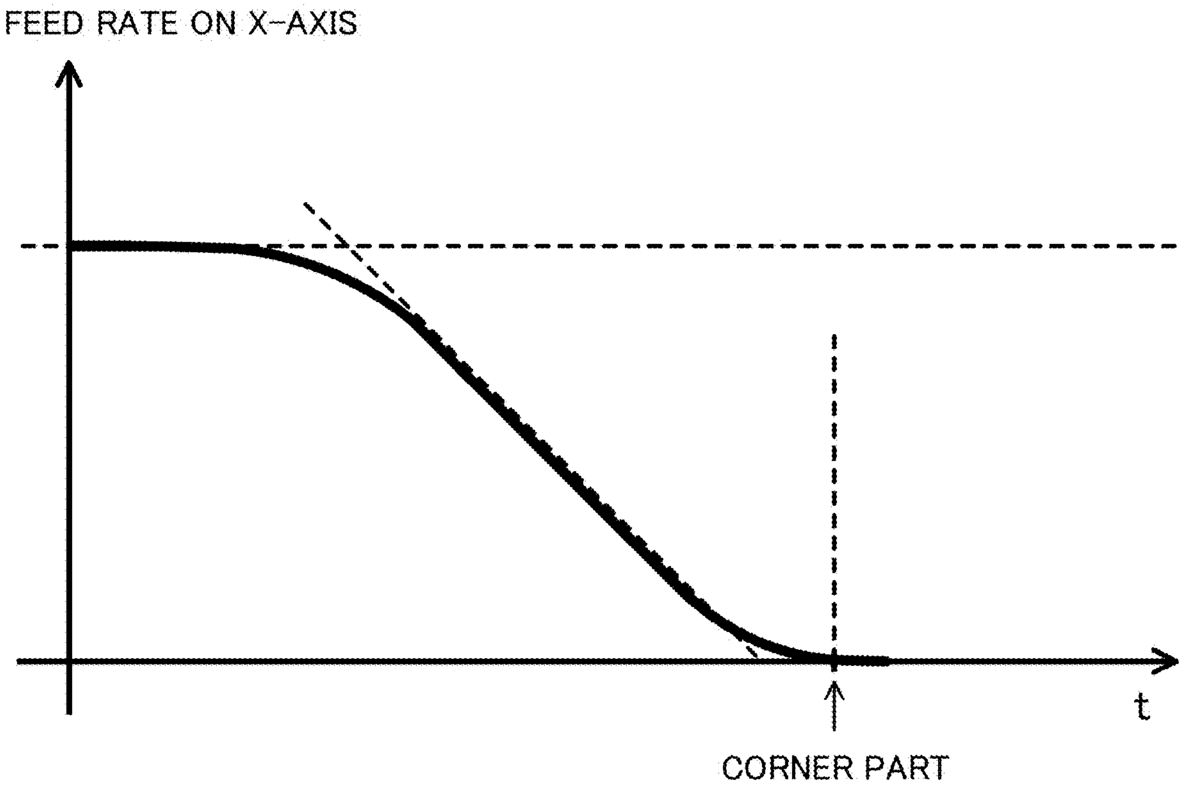
FIG. 5A is a diagram illustrating an example of a deceleration plan.
Figure 5B:
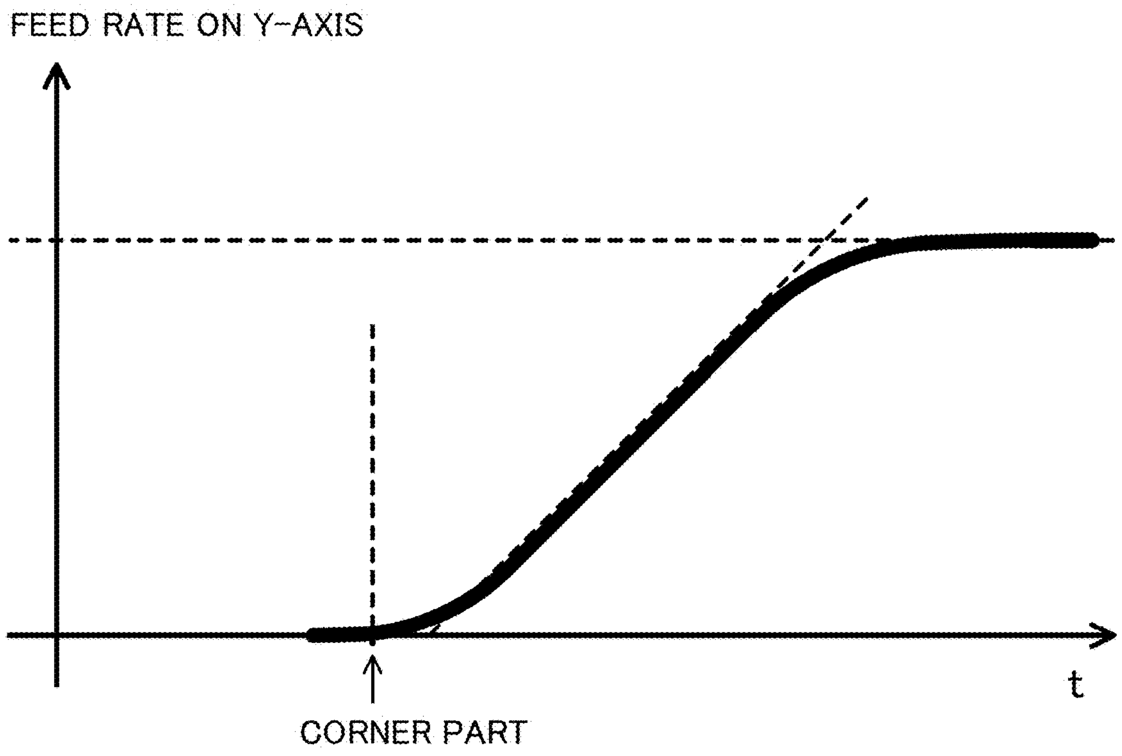
FIG. 5B is a diagram illustrating an example of an acceleration plan.

FIG. 5A and FIG. 5B are diagrams illustrating examples of the deceleration plan and the acceleration plan, respectively. FIG. 5A and FIG. 5B represent a deceleration plan and an acceleration plan, respectively, generated when the corner part is detected from the machining program illustrated in FIG. 3. Note that the deceleration plan illustrated in FIG. 5A represents the feed rate on the X-axis. Further, the acceleration plan illustrated in FIG. 5B represents the feed rate on the Y-axis.

The first rate-planning unit 23 generates a deceleration plan defining the feed rate on the X-axis. For example, the first rate-planning unit 23 generates a deceleration plan defining the feed rate on the X-axis based on values of a predetermined parameter representing the minimum acceleration and a predetermined parameter representing the minimum jerk. That is, the first rate-planning unit 23 generates a deceleration plan so that the acceleration and the jerk on the X-axis are not smaller than the minimum acceleration and the minimum jerk. Herein, the minimum acceleration and the minimum jerk are negative values.

The first rate-planning unit 23 generates an acceleration plan defining the feed rate on the Y-axis. For example, the first rate-planning unit 23 generates an acceleration plan defining the feed rate on the Y-axis based on values of a predetermined parameter representing the maximum acceleration and a predetermined parameter representing the maximum jerk. That is, the first rate-planning unit 23 generates an acceleration plan so that the acceleration and the jerk on the Y-axis are not larger than the maximum acceleration and the maximum jerk. Herein, the maximum acceleration and the maximum jerk are positive values.

Note that, when the tool moves at an angle relative to the X-axis direction and the Y-axis direction when moving toward a corner part and moving away from the corner part, the first rate-planning unit 23 generates deceleration plans defining feed rates on the X-axis and the Y-axis, respectively, and acceleration plans defining feed rates on the X-axis and the Y-axis, respectively. That is, a deceleration plan defining a feed rate in the X-axis direction, a deceleration plan defining a feed rate in the Y-axis direction, an acceleration plan defining a feed rate in the X-axis direction, and an acceleration plan defining a feed rate in the Y-axis direction are generated.

The instruction generation unit 24 overlaps a deceleration period specified by a deceleration plan and an acceleration period specified by an acceleration plan and thereby generates a curve instruction path representing a motion path of a tool and a first instruction rate information representing a first provisional feed rate of the tool on the curve instruction path.

Figure 6:
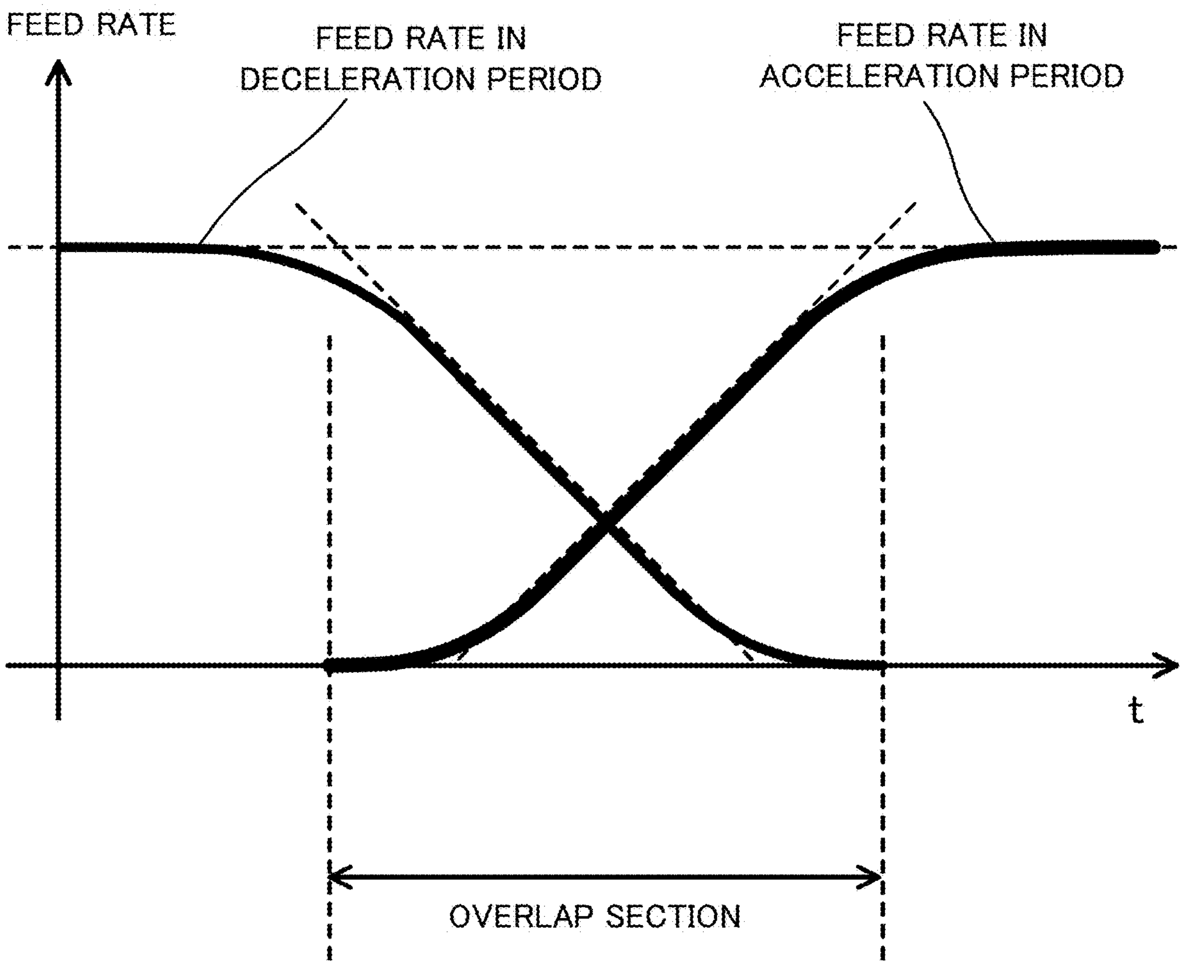
FIG. 6 is a diagram in which a feed rate in a deceleration period and a feed rate in an acceleration period are overlapped.

FIG. 6 is a diagram in which a feed rate in a deceleration period on the X-axis specified by a deceleration plan and a feed rate in an acceleration period on the Y-axis specified by an acceleration plan are overlapped. The instruction generation unit 24 overlaps a deceleration period and an acceleration period based on a predetermined overlap section. Herein, the overlap section refers to a section in which a deceleration period and an acceleration period are overlapped. The instruction generation unit 24 overlaps a deceleration period and an acceleration period, and thereby a curve instruction path representing the motion path of the tool is defined.

Figure 7:
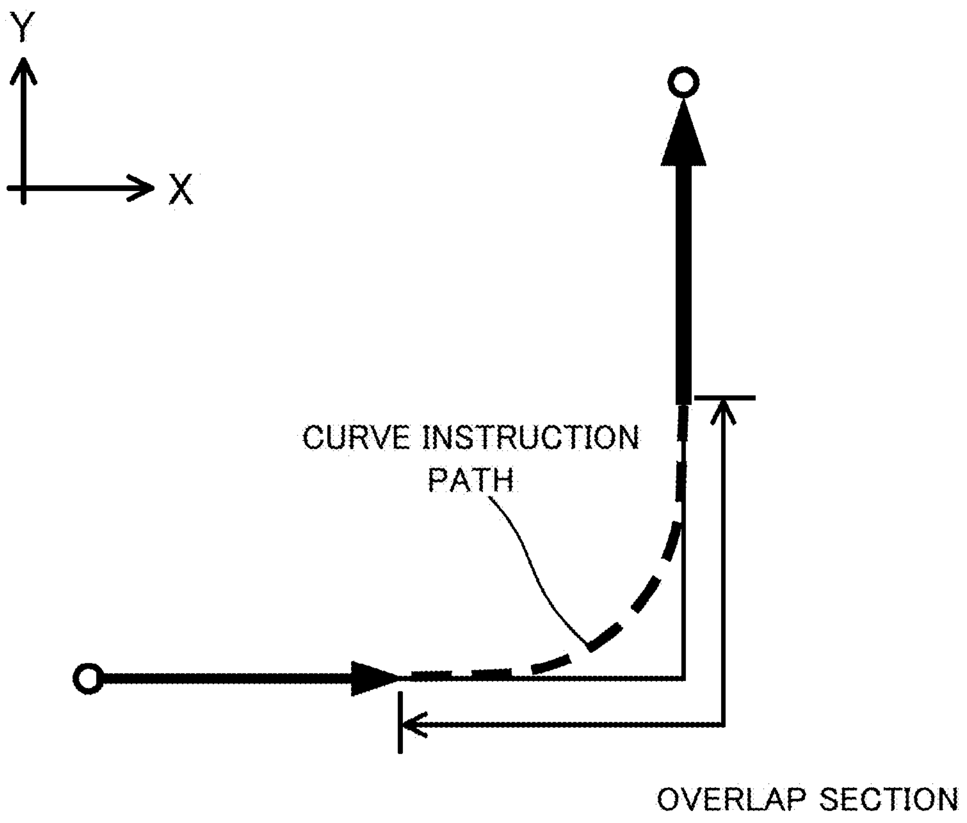
FIG. 7 is a diagram illustrating an example of a curve instruction path.

FIG. 7 is a diagram illustrating an example of a curve instruction path. As described above, a deceleration period on the X-axis and the acceleration period on the Y-axis are overlapped. Thus, the acceleration period on the Y-axis starts in the deceleration period on the X-axis. Accordingly, the tool moves on the curve instruction path in a curved shape around the corner part.

Further, the instruction generation unit 24 combines a feed rate indicated by a deceleration plan and a feed rate indicated by an acceleration plan in the overlap section and thereby generates first instruction rate information indicating the first provisional feed rate. The first provisional feed rate is a rate in a tangential direction when a tool moves on a curve instruction path. Combining refers to adding. As described later, the first provisional feed rate will be a candidate of an actual feed rate when a tool actually moves and will not necessarily be used as the actual feed rate of the tool. Thus, the expression of "provisional" is used herein.

Figure 8:
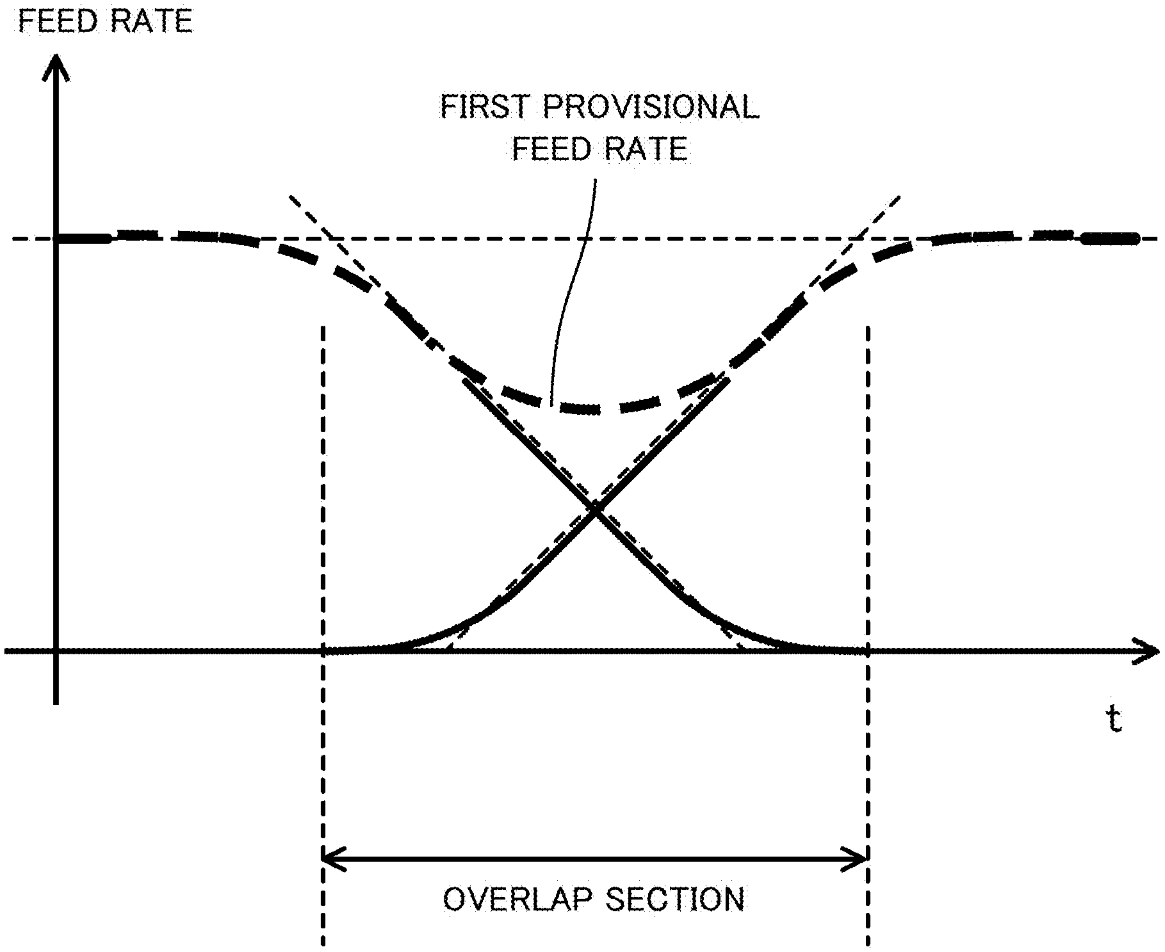
FIG. 8 is a diagram illustrating an example of a first provisional feed rate on a curve instruction path.

FIG. 8 is a diagram illustrating an example of the first provisional feed rate on a curve instruction path. The first provisional feed rate is gradually reduced as being closer to the intermediate point of the overlap section, that is, the intermediate position on the curve instruction path. Further, the first provisional feed rate is gradually increased as being more distant from the intermediate position on the curve instruction path.

The instruction generation unit 24 overlaps the deceleration period and the acceleration period so that the difference between a path indicated by an instruction for a corner part designated by the machining program and the curve instruction path is within a predetermined range. Herein, the predetermined range is an allowable path error. The allowable path error is set in a parameter in advance.

The second rate-planning unit 25 generates second instruction rate information indicating a second provisional feed rate of a tool on a curve instruction path so that an acceleration on the curve instruction path generated by the instruction generation unit 24 is less than or equal to a predetermined allowable acceleration.

As described later, the second provisional feed rate will be a candidate of an actual feed rate when a tool actually moves and will not necessarily be used as the actual feed rate of the tool. Thus, the expression of "provisional" is used herein.

The acceleration on a curve instruction path is an acceleration occurring on a tool when the tool is moved on the curve instruction path, which is an acceleration occurring in the normal direction of the curve instruction path.

For example, when the curve instruction path is expressed by x=x(t), y=y(t), the radius of curvature of the curve instruction path is expressed by Equation 1 below.

$$R(t) = \frac{\left\{\left(\frac{dx}{dt}\right)^2 + \left(\frac{dy}{dt}\right)^2\right\}^{\frac{3}{2}}}{\left|\frac{dx}{dt}\frac{d^2y}{dt^2} - \frac{dy}{dt}\frac{d^2x}{dt^2}\right|} \quad \text{[Equation 1]}$$

Further, Equation 2 below is met, where the allowable acceleration is denoted as "a".

$$\frac{v(t)^2}{R(t)} \le a \quad \text{[Equation 2]}$$

Herein, v(t) is a rate in the tangential direction of the curve instruction path, that is, the second provisional feed rate. Further, Equation 3 below is found from Equation 2.

$$v(t) \le \sqrt{aR(t)} \quad \text{[Equation 3]}$$

Accordingly, the second provisional feed rate is found.

For example, the allowable acceleration is an acceleration at a level that does not affect the quality of a machined surface. For example, the allowable acceleration is determined based on experiments performed in advance. The allowable acceleration may be set in a parameter in advance.

Figure 9:
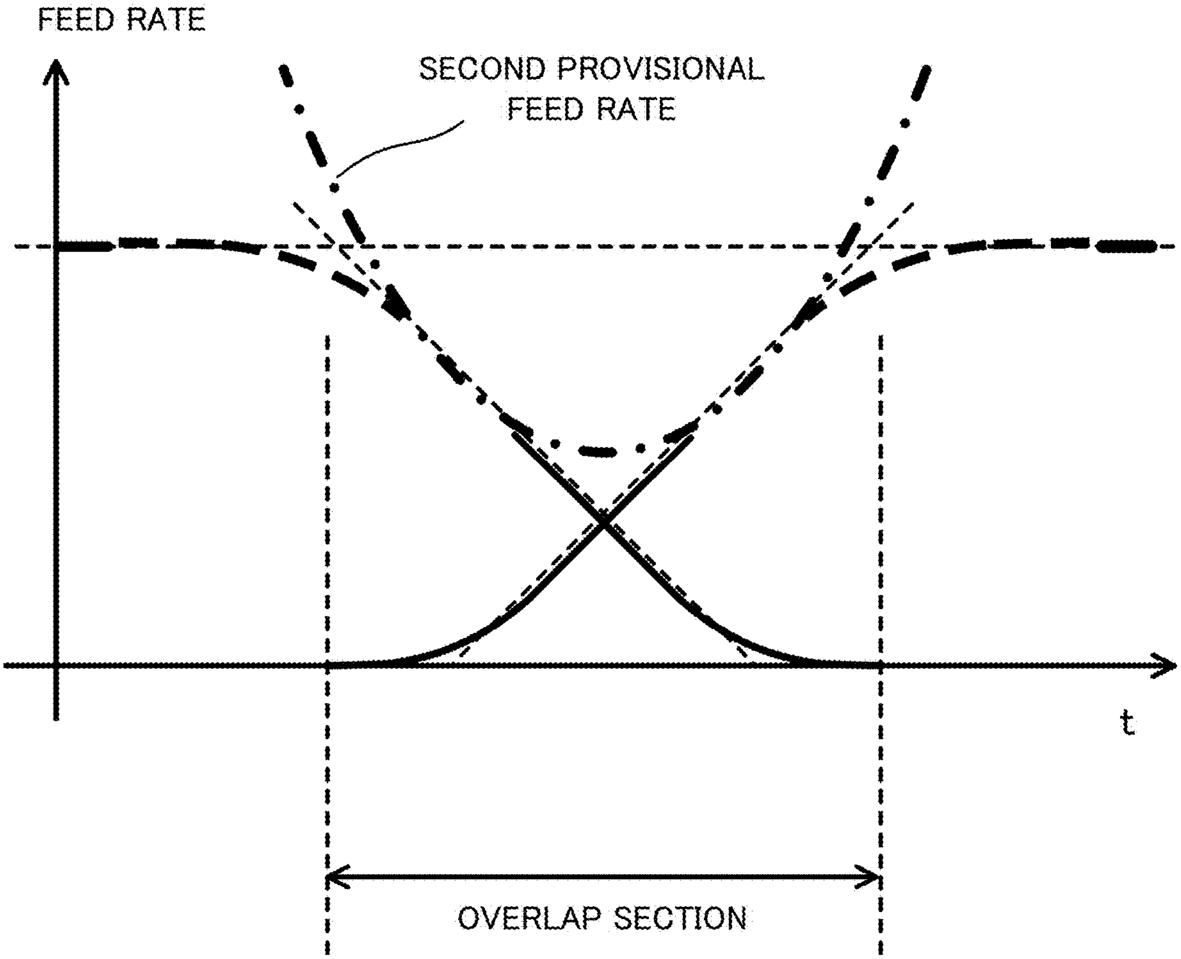
FIG. 9 is a diagram illustrating an example of a second provisional feed rate.

FIG. 9 is a diagram illustrating an example of the second provisional feed rate. The second provisional feed rate is determined so as to increase at a position at which the radius of curvature of the curve instruction path is relatively larger and to decrease at a position at which the radius of curvature is relatively smaller. In general, the radius of curvature is smallest at the intermediate position on a curve instruction path. Thus, the second rate-planning unit 25 determines the second provisional feed rate to be lowest at the intermediate position on a curve instruction path.

The instruction rate generation unit 26 generates third instruction rate information indicating an actual feed rate when a tool actually moves on a curve instruction path based on the first instruction rate information and the second instruction rate information. For example, the instruction rate generation unit 26 generates the third instruction rate information based on the smaller one of the first provisional feed rate and the second provisional feed rate.

Figure 10:
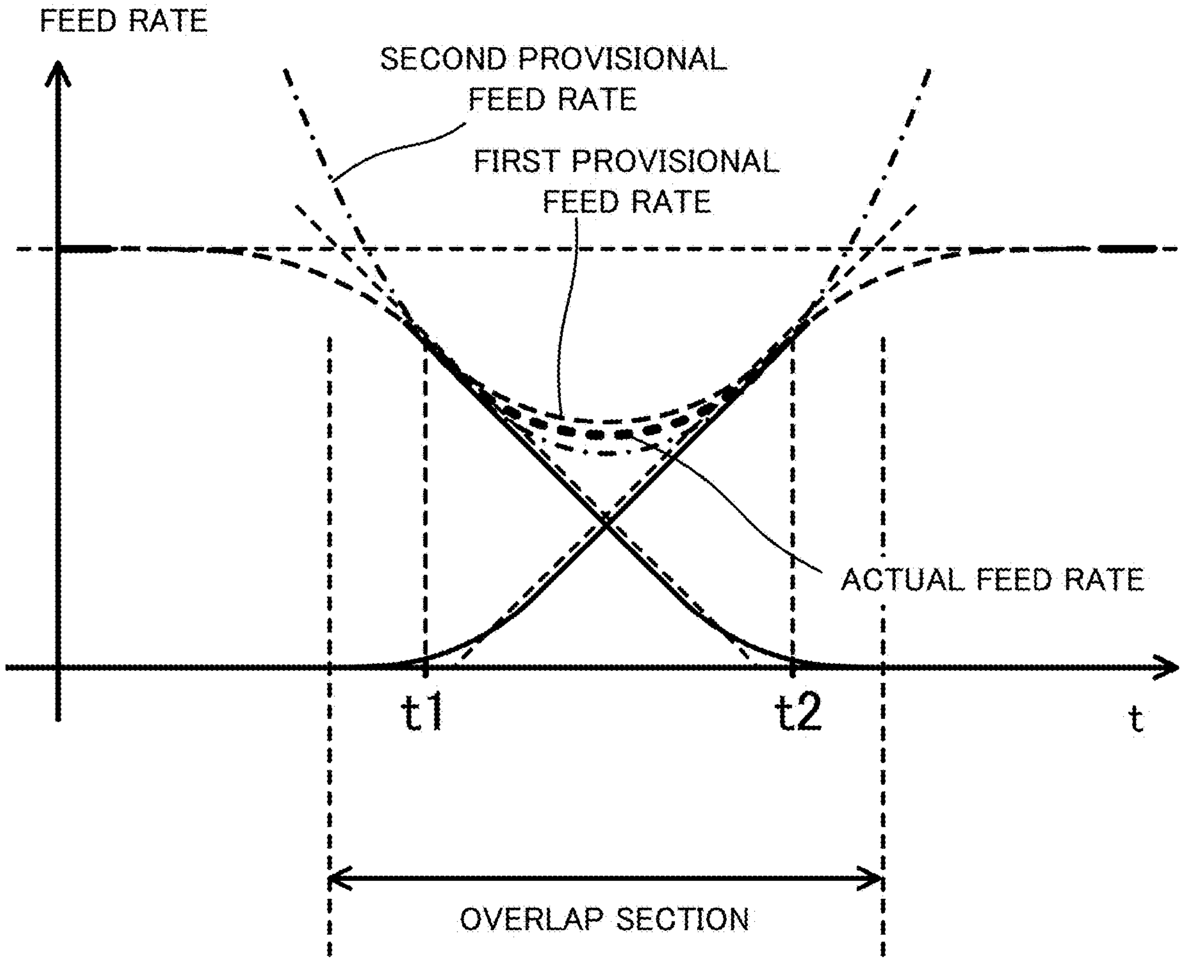
FIG. 10 is a diagram illustrating third instruction rate information.

FIG. 10 is a diagram illustrating the third instruction rate information. In FIG. 10, in the period between t1 and t2, the second provisional feed rate indicated by the second instruction rate information is less than the first provisional feed rate indicated by the first instruction rate information. Therefore, the instruction rate generation unit 26 generates the third instruction rate information so that the actual feed rate in the period from t1 to t2 is the second provisional feed rate.

Figure 11:
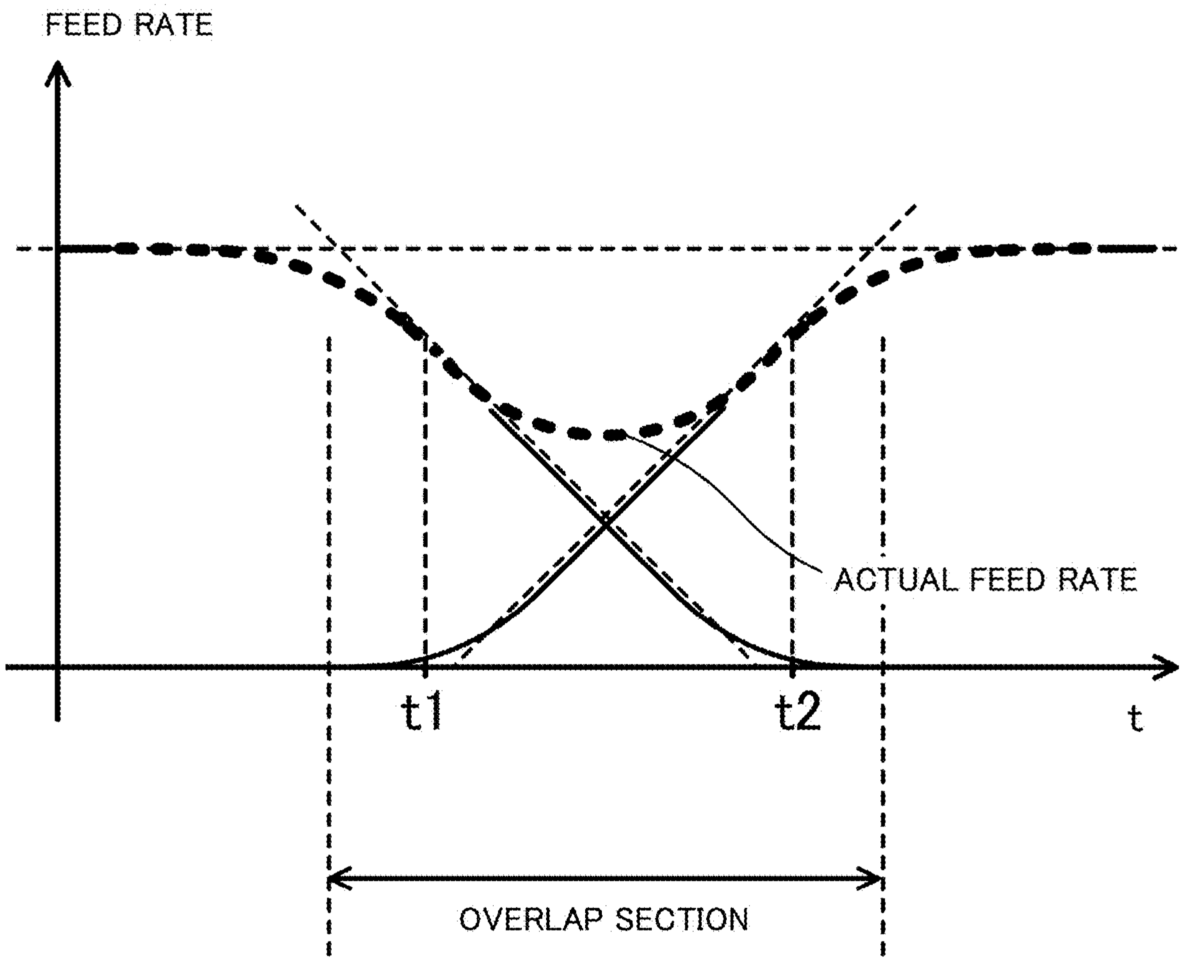
FIG. 11 is a diagram illustrating an example of the third instruction rate information.

Further, in other periods than the period from t1 to t2, the first provisional feed rate is less than the second provisional feed rate. Therefore, the instruction rate generation unit 26 generates the third instruction rate information so that the actual feed rate in other periods than the period from t1 to t2 is the first provisional feed rate (see FIG. 11).

The instruction rate generation unit 26 may set the actual feed rate to the first provisional feed rate when the first provisional feed rate is less than or equal to the second provisional feed rate and may set the actual feed rate to a rate that is less than the first provisional feed rate and greater than or equal to the second provisional feed rate when the first provisional feed rate is greater than the second provisional feed rate.

Further, the instruction rate generation unit 26 may determine an actual feed rate indicated by the third instruction rate information based on Equation 4 below when the first provisional feed rate is greater than the second provisional feed rate.

$$V3 = K \times V1 + (1 - K) \times V2 \quad \text{[Equation 4]}$$

Note that V3 is the actual feed rate, K is the interior division ratio, V1 is the first provisional feed rate, V2 is the second provisional feed rate, and $0 \le K \le 1$. In such a case, when the interior division ratio is 0, the actual feed rate is the rate indicated by the second provisional feed rate. Further, when the first provisional feed rate and the second provisional feed rate match, the interior division ratio may be 1.

The instruction rate generation unit 26 may reduce the interior division ratio as being closer to the intermediate position on the curve instruction path and may increase the interior division ratio as being more distant from the intermediate position.

Figure 12:
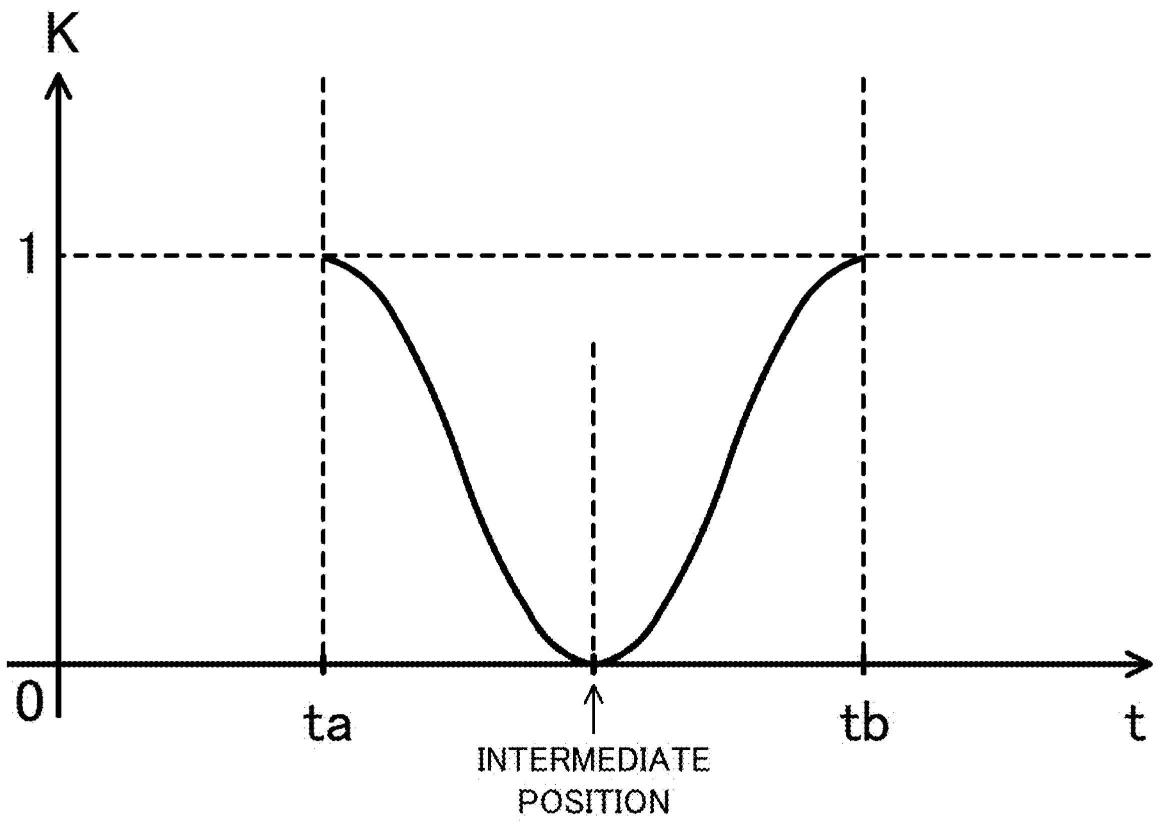
FIG. 12 is a diagram illustrating an example of an interior division ratio.

FIG. 12 is a diagram illustrating an example of the interior division ratio. In FIG. 12, the interior division ratio decreases as being closer to the intermediate position from ta, and the interior division ratio increases as being more distant from the intermediate position. Note that ta and tb may be positions at which the first provisional feed rate and the second provisional feed rate match. In such a case, the interior division ratio is 1 at positions where the first provisional feed rate and the second provisional feed rate match. Further, the interior division ratio is 0 at the intermediate position.

Figure 13:
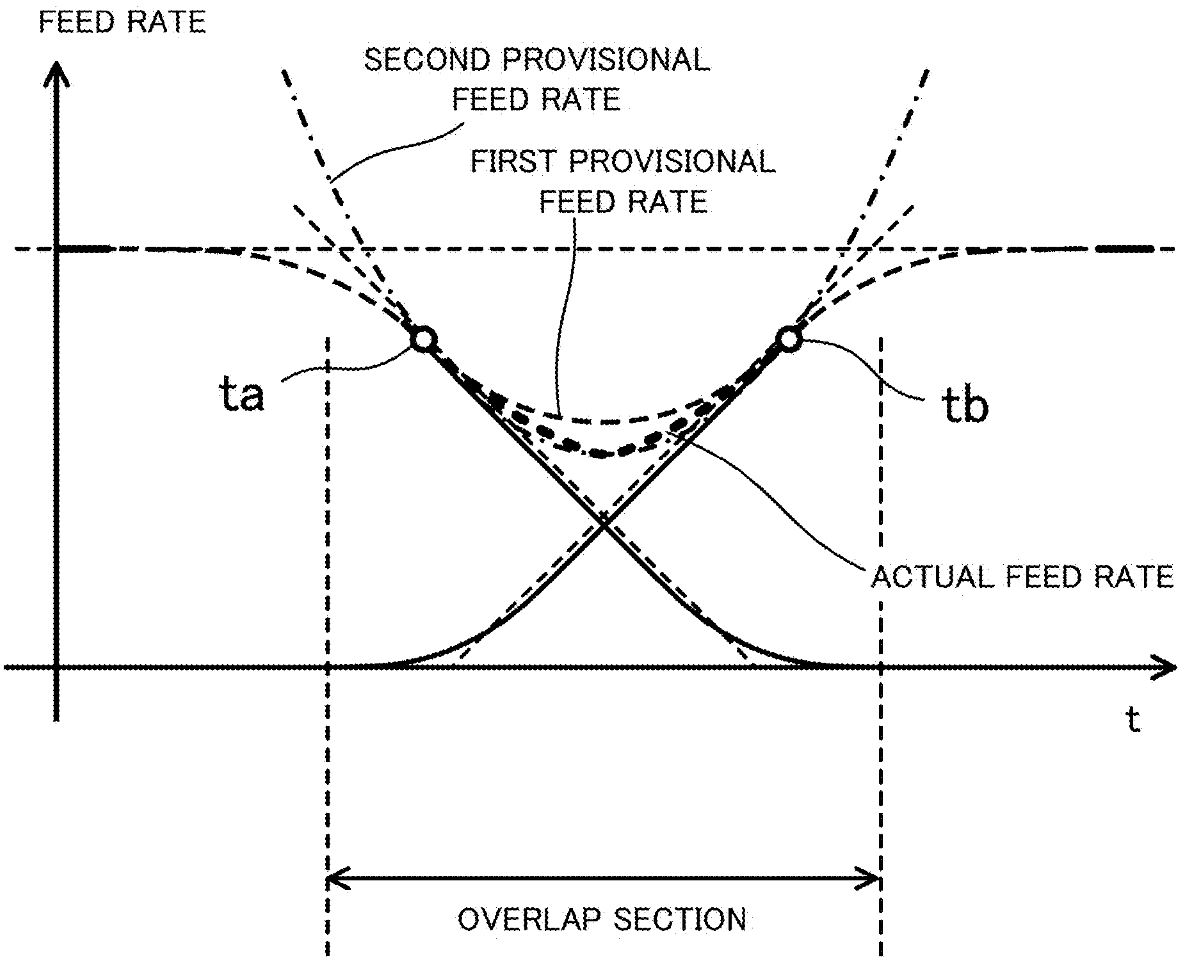
FIG. 13 is a diagram illustrating an example of an actual feed rate illustrated by the third instruction rate information.

FIG. 13 is a diagram illustrating an example of the actual feed rate indicated by the third instruction rate information. The actual feed rate illustrated in FIG. 13 is the actual feed rate generated when the interior division ratio illustrated in FIG. 12 is used. The actual feed rate is the same as the first provisional feed rate at positions where the first provisional feed rate and the second provisional feed rate match. Further, the actual feed rate is the same as the second provisional feed rate at the intermediate position. Further, the actual feed rate is reduced while being maintained at a larger rate than the second provisional feed rate from ta to the intermediate position. Further, the actual feed rate is increased while being maintained at a larger rate than the second provisional feed rate from the intermediate position to tb. That is, the part near the corner part is machined in a shorter time than in a case where the second provisional feed rate is employed as the actual feed rate.

Note that the interior division ratio in Equation 4 above may be expressed by a predetermined polynomial. Further, the interior division ratio may be a predetermined constant.

The control unit 27 moves a tool along the curve instruction path based on an actual feed rate generated by the instruction rate generation unit 26.

Next, a flow of processes performed by the numerical control device 2 will be described.

Figure 14:
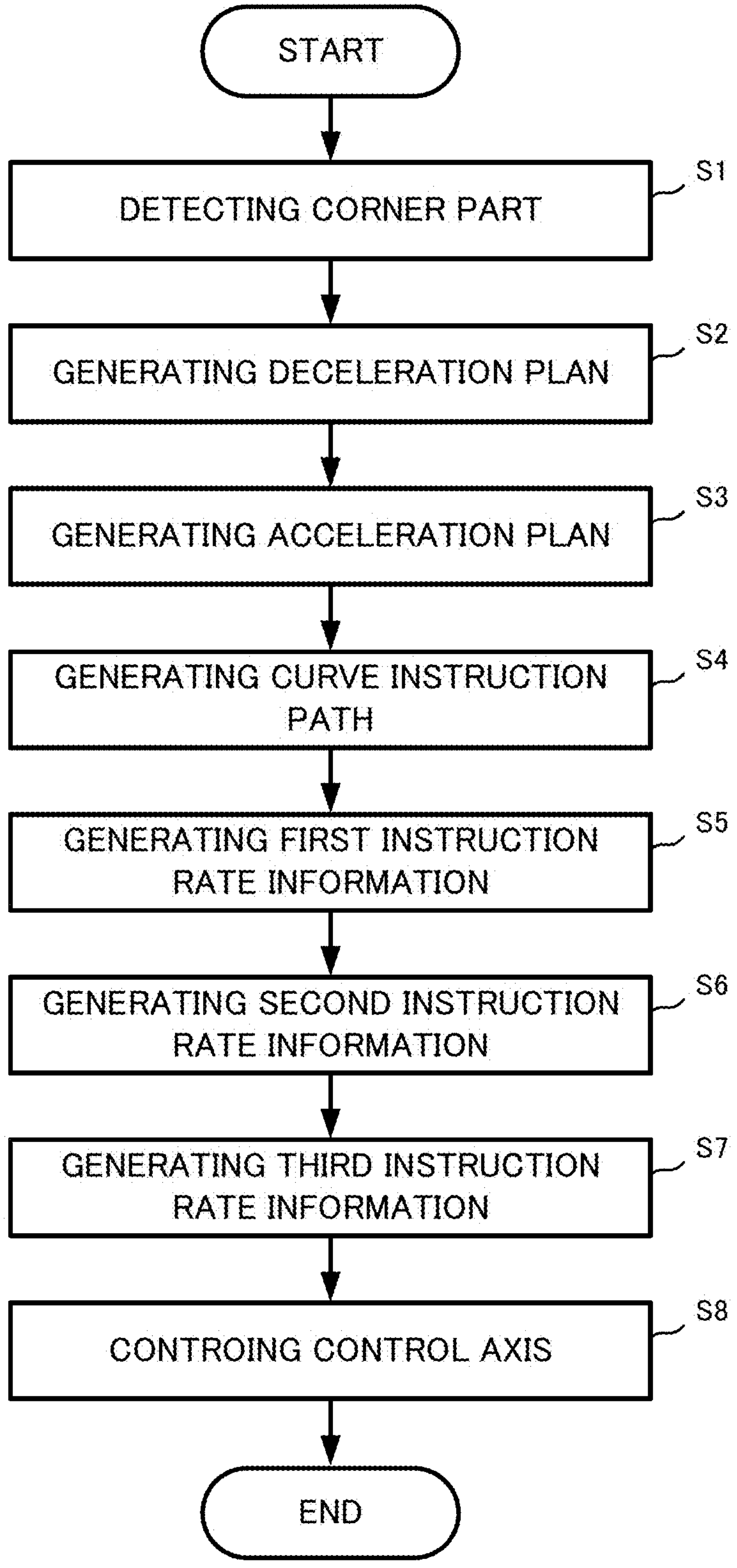
FIG. 14 is a flowchart illustrating an example of a flow of processes performed by the numerical control device.

FIG. 14 is a flowchart illustrating an example of a flow of the processes performed by the numerical control device 2. Note that the order of the flow of the processes described below may be changed as appropriate.

In the numerical control device 2, first the corner detection unit 22 detects an instruction on a corner part from a machining program (step S1).

Next, the first rate-planning unit 23 generates a deceleration plan defining a feed rate of the control axis when a tool moves toward the corner part (step S2).

Next, the first rate-planning unit 23 generates an acceleration plan defining a feed rate of the control axis when the tool moves away from the corner part (step S3).

Next, the instruction generation unit 24 generates a curve instruction path representing a motion path of the tool (step S4).

Next, the instruction generation unit 24 generates the first instruction rate information indicating the first provisional feed rate of the tool on the curve instruction path (step S5).

Next, the second rate-planning unit 25 generates the second instruction rate information indicating the second provisional feed rate of the tool on the curve instruction path (step S6).

Next, the instruction rate generation unit 26 generates the third instruction rate information indicating an actual feed rate when the tool actually moves on the curve instruction path (step S7).

Next, the control unit 27 controls the control axes based on the machining program (step S8) and ends the process. The control unit 27 moves the tool along the curve instruction path based on the actual feed rate when controlling the control axes based on the machining program.

As described above, the control device includes: the corner detection unit 22 that detects, from a machining program, an instruction on a corner part where a direction of machining performed by a tool is changed discontinuously; the first rate-planning unit 23 that, based on the instruction, generates a deceleration plan defining a feed rate of a control axis when the tool moves toward the corner part and an acceleration plan defining a feed rate of the control axis when the tool moves away from the corner part; the instruction generation unit 24 that overlaps a deceleration period specified by the deceleration plan and an acceleration period specified by the acceleration plan to generate a curve instruction path, which represents a motion path of the tool, and first instruction rate information, which indicates a first provisional feed rate of the tool on the curve instruction path; the second rate-planning unit 25 that generates second instruction rate information indicating a second provisional feed rate of the tool on the curve instruction path so that an acceleration on the curve instruction path generated by the instruction generation unit 24 is less than or equal to a predetermined allowable acceleration; and the instruction rate generation unit 26 that, based on the first instruction rate information and the second instruction rate information, generates third instruction rate information indicating an actual feed rate when the tool actually moves on the curve instruction path. Further, the instruction rate generation unit 26 generates the third instruction rate information based on the smaller one of the first provisional feed rate and the second provisional feed rate. Therefore, the control device can suppress vibration from occurring near the corner part and stabilize the motion of respective control axes. As a result, the quality of the machined surface near the corner part is improved.

Further, the instruction rate generation unit 26 sets the actual feed rate to be the first provisional feed rate when the first provisional feed rate is less than or equal to the second provisional feed rate, and the instruction rate generation unit 26 sets the actual feed rate to be a rate that is less than the first provisional feed rate and greater than or equal to the second provisional feed rate when the first provisional feed rate is greater than the second provisional feed rate. In such a case, for example, the operator is able to determine the actual feed rate in accordance with the material of a workpiece or the like. Accordingly, the optimal machining conditions in accordance with the workpiece are selected, and the quality of the machined surface near the corner part is thus improved.

Further, when the first provisional feed rate is greater than the second provisional feed rate, the instruction rate generation unit 26 determines the actual feed rate based on Equation 4 described above. Also in such a case, the interior division ratio can be determined in accordance with the material of the workpiece or the like. As a result, machining conditions in accordance with the workpiece are selected, and the quality of the machined surface is thus improved.

Further, the interior division ratio may be reduced as being closer to an intermediate position on the curve instruction path and may be increased as being more distant from the intermediate position. In such a case, the actual feed rate can be made relatively larger in a portion having a relatively larger radius of curvature of the curve instruction path, and the actual feed rate can be made smaller in a portion having a relatively smaller radius of curvature of the curve instruction path. Thus, the actual feed rate can be set in accordance with the inertia force occurring on each control axis. As a result, the quality of the machined surface near the corner part is thus improved.

Further, the interior division ratio may be a predetermined constant. In such a case, the calculation equation for finding an actual feed rate is simplified, and the control device can relatively easily generate the third instruction rate information.

Further, the instruction generation unit 24 overlaps the deceleration period and the acceleration period so that the difference between a path indicated by the instruction on the corner part designated by the machining program and the curve instruction path is within a predetermined range. Thus, the control device can reduce the path error between a path designated by a machining program and an actual motion path of the tool.

In the embodiment described above, the example of machining a corner part formed such that the motion path along the X-axis and the motion path along the Y-axis intersect at a right angle has been described. However, the corner part may be of an acute angle or may be of an obtuse angle. Further, motion paths forming a corner part is not necessarily required to be paths along the X-axis and the Y-axis, respectively.

In the following, an example of a corner part formed such that motion paths intersect at an acute angle will be described.

Figure 15:
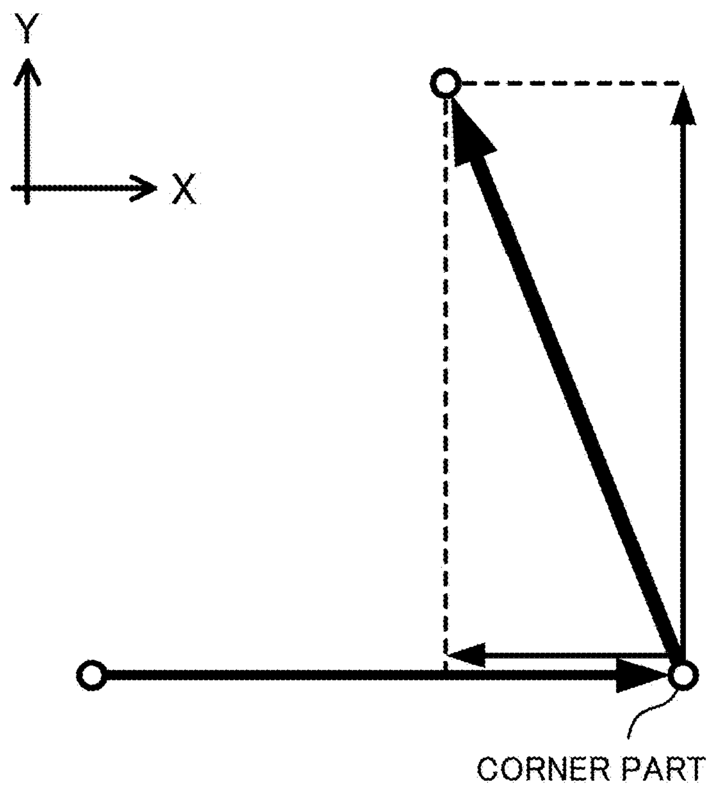
FIG. 15 is a diagram illustrating an example of an instruction path.

FIG. 15 is a diagram illustrating an example of an instruction path designated by a machining program. When an instruction on the corner part illustrated in FIG. 15 is detected by the corner detection unit 22, the first rate-planning unit 23 generates a deceleration plan defining a feed rate of the control axes when the tool moves toward the corner part and an acceleration plan defining a feed rate of the control axes when the tool moves away from the corner part. Specifically, the first rate-planning unit 23 generates a deceleration plan defining a feed rate in the X-axis direction when the tool moves toward the corner part and an acceleration plan for the X-axis direction and an acceleration plan for the Y-axis direction when the tool moves away from the corner part.

Figure 16A:
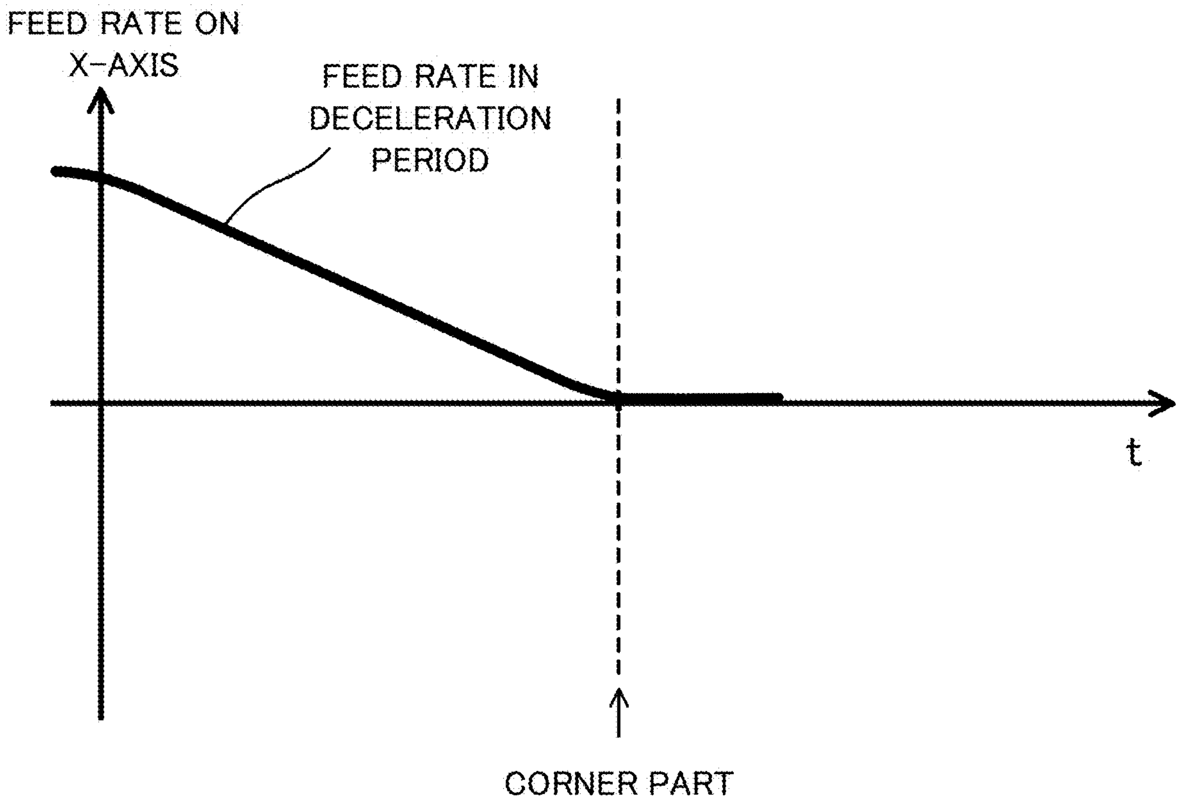
FIG. 16A is a diagram illustrating an example of a deceleration plan.
Figure 16B:
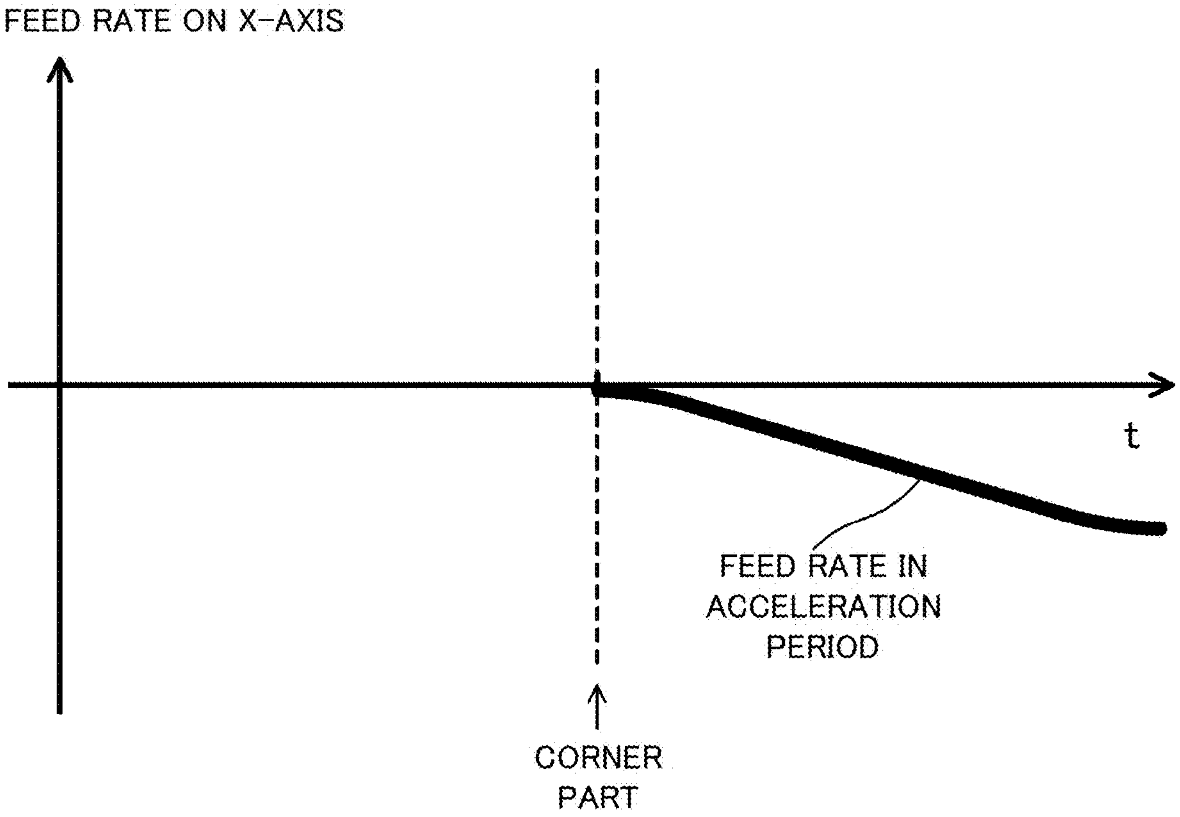
FIG. 16B is a diagram illustrating an example of an acceleration plan.

FIG. 16A is a diagram illustrating an example of the deceleration plan defining a feed rate in the X-axis direction when the tool moves toward the corner part. FIG. 16B is a diagram illustrating an example of the acceleration plan defining a feed rate in the X-axis direction when the tool moves away from the corner part. The first rate-planning unit 23 generates a deceleration plan so that the feed rate in the X-axis direction is reduced as being closer to the corner part. Further, the first rate-planning unit 23 generates an acceleration plan so that the feed rate in the X-axis direction is increased in the minus direction as being more distant from the corner part.

The instruction generation unit 24 overlaps the feed rate in a direction along a control axis in the deceleration period and the feed rate in the direction along the control axis in the acceleration period. Herein, the direction along the control axis is the X-axis direction, for example. When the direction along the control axis is the X-axis direction, the instruction generation unit 24 overlaps the feed rate in the X-axis direction in the deceleration period and the feed rate in the X-axis direction in the acceleration period.

Figure 17:
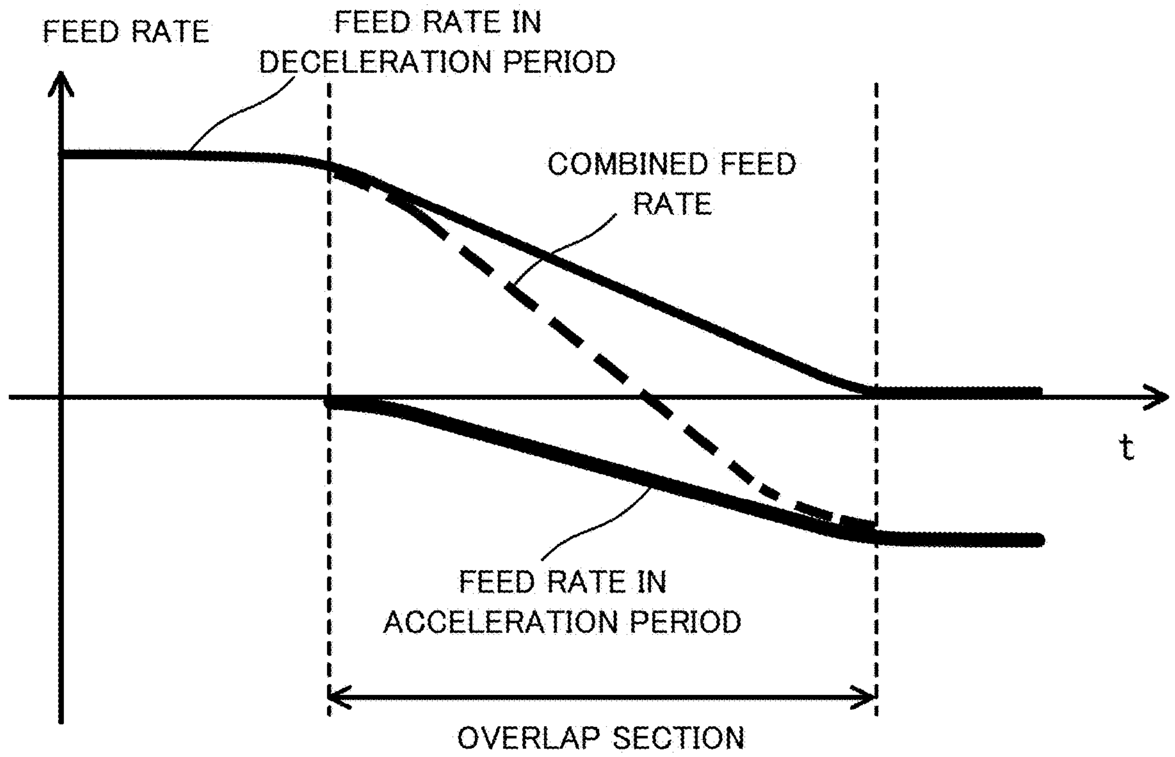
FIG. 17 is a diagram illustrating that feed rates in the X-axis direction in a deceleration period and an acceleration period are overlapped.

FIG. 17 is a diagram illustrating that the feed rates in the X-axis direction in the deceleration period and the acceleration period are overlapped. The instruction generation unit 24 overlaps the feed rate in the X-axis direction in the deceleration period and the feed rate in the X-axis direction in the acceleration period based on the overlap section. The length of the overlap section may be defined in a parameter or the like in advance.

Furthermore, the instruction generation unit 24 generates a combined feed rate in the direction along a control axis in the overlap section. The combined feed rate refers to the sum of respective feed rates in the overlap section.

The instruction generation unit 24 further calculates an acceleration in the deceleration period and an acceleration in the acceleration period based on the feed rate in the deceleration period and the feed rate in the acceleration period, respectively.

Figure 18:
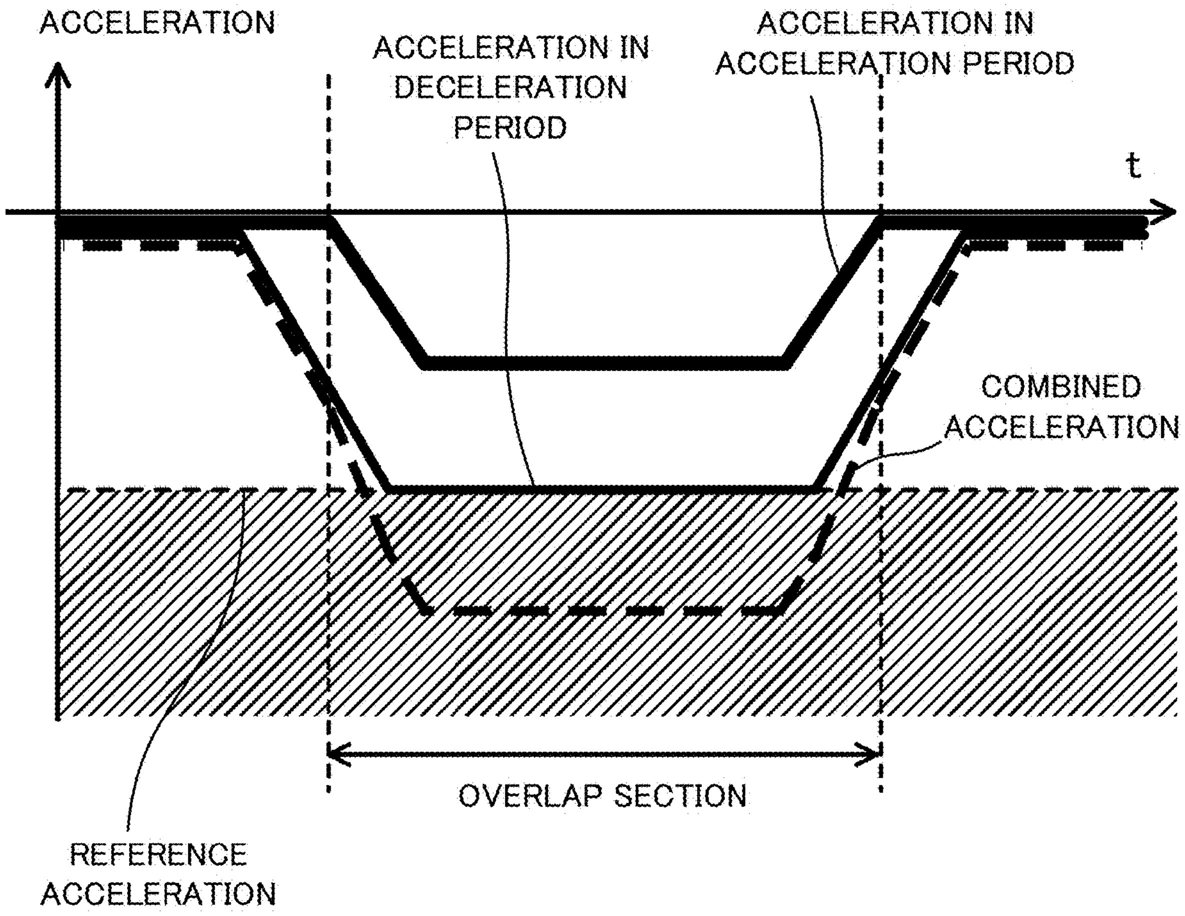
FIG. 18 is a diagram illustrating an acceleration for a deceleration period and an acceleration for an acceleration period.

FIG. 18 is a diagram illustrating the acceleration in the deceleration period and the acceleration in the acceleration period. The instruction generation unit 24 generates a combined acceleration of the overlap section based on the acceleration in the deceleration period and the acceleration in the acceleration period. The combined acceleration refers to the sum of respective accelerations in the overlap section. Further, the combined acceleration is an acceleration when the tool is moved in the direction along a control axis at the combined feed rate.

The instruction generation unit 24 further estimates whether or not the combined acceleration exceeds a predetermined reference acceleration. The reference acceleration refers to an acceleration tolerated in the direction along a control axis. The reference acceleration is set to a value around which the machined surface of a workpiece is not adversely affected when the tool is moved at the reference acceleration. The reference acceleration is determined for each control axis.

If the combined acceleration obtained when the tool is moved in the direction along a control axis at the combined feed rate exceeds the reference acceleration, the instruction generation unit 24 adjusts a start timing of the acceleration period relative to the deceleration period so that the acceleration in the direction along the control axis does not exceed the reference acceleration.

A method of adjusting the start timing of the acceleration period relative to the deceleration period will now be described.

Figure 19A:
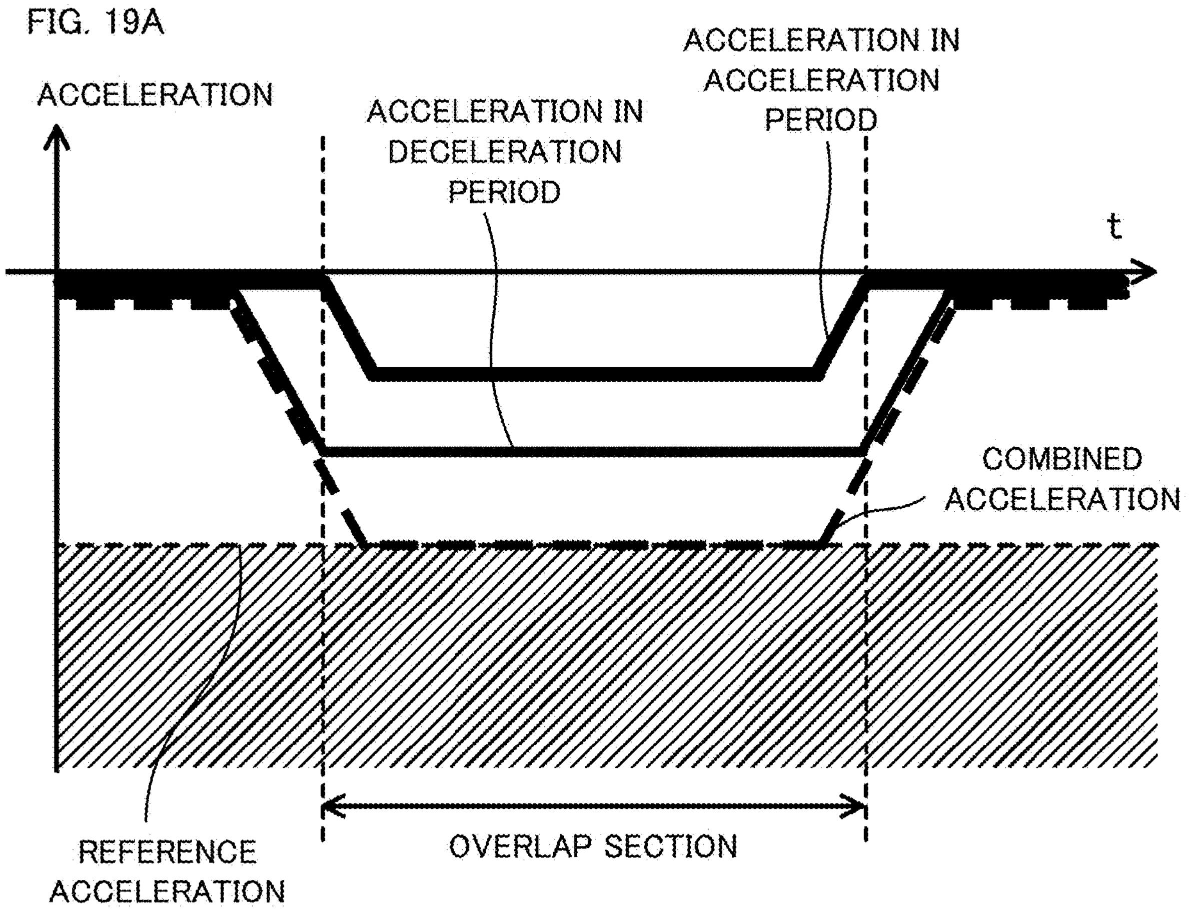
FIG. 19A is a diagram illustrating a method of adjusting a start timing of an acceleration period relative to a deceleration period.
Figure 19B:
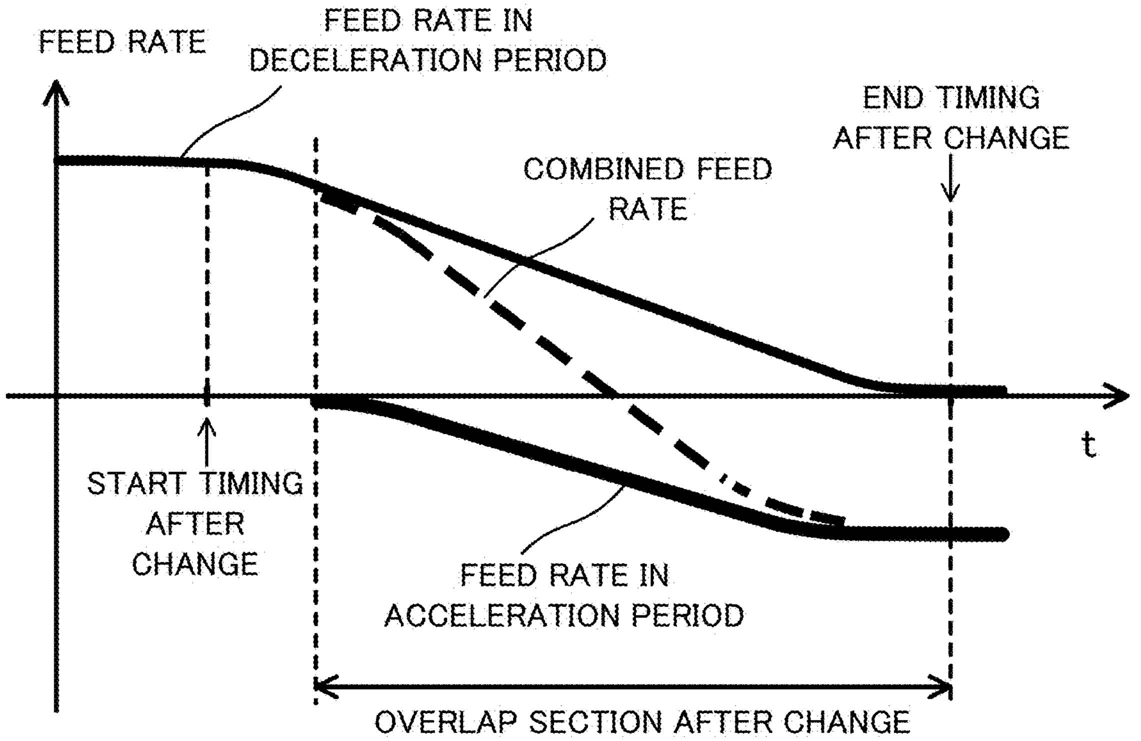
FIG. 19B is a diagram illustrating a method of adjusting a start timing of an acceleration period relative to a deceleration period.

FIG. 19A and FIG. 19B are diagrams illustrating the method of adjusting the start timing of the acceleration period relative to the deceleration period. As illustrated in FIG. 19A, the instruction generation unit 24 changes the acceleration in the deceleration period and the acceleration in the acceleration period so that the combined acceleration does not exceed the reference acceleration. The ratio at which the acceleration in the deceleration period and the acceleration in the acceleration period are adjusted may be set in a parameter or the like in advance.

The instruction generation unit 24 calculates a feed rate in the deceleration period and a feed rate in the acceleration period based on the changed acceleration in the deceleration period and the changed acceleration in the acceleration period. When the acceleration in the deceleration period and the acceleration in the acceleration period have been changed to be smaller, the feed rate in the deceleration period and the feed rate in the acceleration period calculated by the instruction generation unit 24 will be as indicated by the diagram illustrated in FIG. 19B. That is, the feed rate in the deceleration period and the feed rate in the acceleration period are changed so as to change more slowly than the feed rates illustrated in FIG. 17. As a result, the start timing of the deceleration period becomes earlier, and the end timing of the deceleration period becomes later. Accordingly, at least any one of the start timing and the end timing of the acceleration period relative to the deceleration period is changed.

The instruction generation unit 24 may further calculate a jerk in the deceleration period and a jerk in the acceleration period based on the acceleration in the deceleration period and the acceleration in the acceleration period, respectively.

Figure 20A:
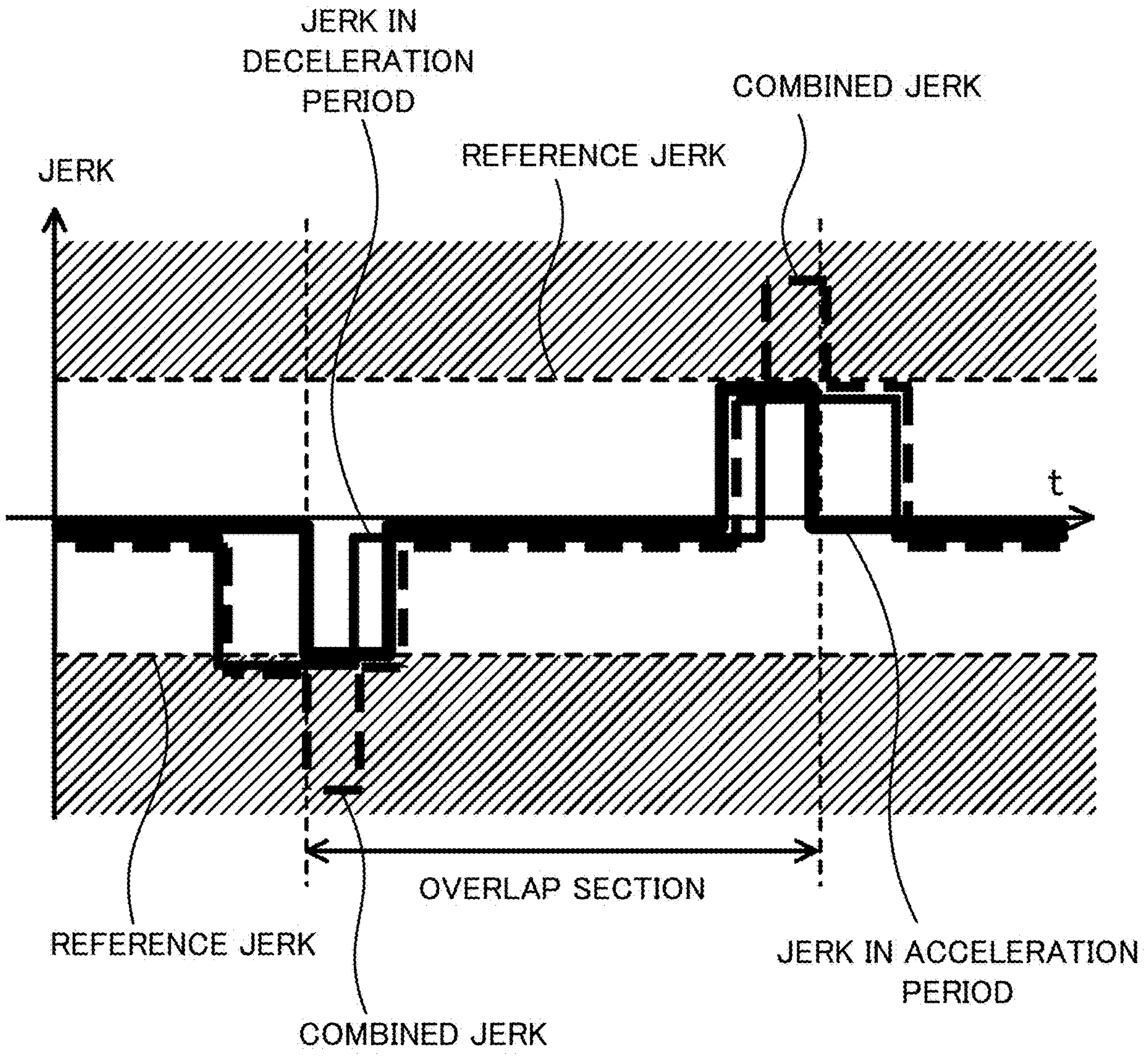
FIG. 20A is a diagram illustrating a jerk in a deceleration period and a jerk in an acceleration period.

FIG. 20A is a diagram illustrating the jerk in the deceleration period and the jerk in the acceleration period. The instruction generation unit 24 generates a combined jerk in the overlap section based on the jerk in the deceleration period and the jerk in the acceleration period. The combined jerk refers to the sum of respective jerks in the overlap section. Further, the combined jerk is a jerk when the tool is moved in the direction along a control axis based on the combined feed rate.

The instruction generation unit 24 further estimates whether or not the combined jerk exceeds a predetermined reference jerk. The reference jerk refers to a jerk tolerated in the direction along a control axis. The reference jerk is set to a value around which the machined surface of a workpiece is not adversely affected when the tool is moved at the reference jerk. The reference jerk is determined for each control axis.

If it is estimated that the combined jerk obtained when the tool is moved in the direction along the control axis based on the combined feed rate exceeds the reference jerk, the instruction generation unit 24 adjusts a start timing of the acceleration period relative to the deceleration period so that the jerk in the direction along the control axis does not exceed the reference jerk.

Figure 20B:
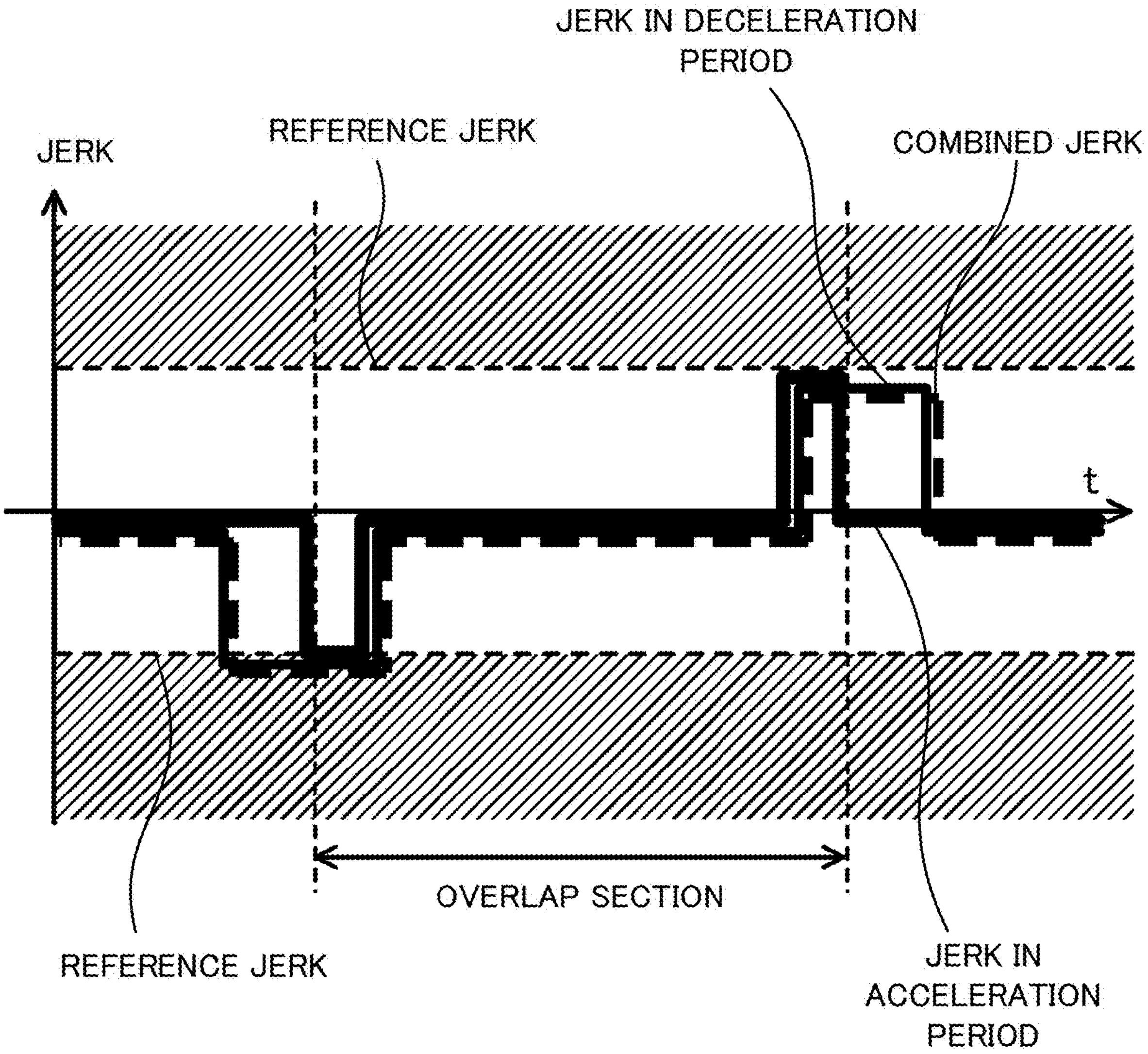
FIG. 20B is a diagram illustrating a jerk in a deceleration period and a jerk in an acceleration period changed so that a combined jerk does not exceed a reference jerk.

As illustrated in FIG. 20B, the instruction generation unit 24 changes the jerk in the deceleration period and the jerk in the acceleration period so that the combined jerk does not exceed the reference jerk. The ratio at which the jerk in the deceleration period and the jerk in the acceleration period are adjusted may be set in a parameter or the like in advance.

The instruction generation unit 24 calculates a feed rate in the deceleration period and a feed rate in the acceleration period based on the changed jerk in the deceleration period and the changed jerk in the acceleration period. When the jerk in the deceleration period and the jerk in the acceleration period have been changed to be smaller, the feed rate in the deceleration period and the feed rate in the acceleration period calculated by the instruction generation unit 24 will be as indicated by the diagram illustrated in FIG. 19B. That is, the feed rate in the deceleration period and the feed rate in the acceleration period are changed so as to change slowly. As a result, the start timing of the deceleration period becomes earlier, and the end timing of the deceleration period becomes later. Accordingly, at least any one of the start timing and the end timing of the acceleration period relative to the deceleration period is changed.

The instruction generation unit 24 then overlaps the combined feed rate in the X-axis direction and the feed rate in the Y-axis direction to generate a curve instruction path representing the motion path of the tool and the first instruction rate information indicating the first provisional feed rate of the tool on the curve instruction path. The subsequent processes are the same as those in the embodiment described above.

Note that it is sufficient that the instruction generation unit 24 estimates at least any one of whether or not the combined acceleration exceeds the reference acceleration and whether or not the combined jerk exceeds the reference jerk.

The present disclosure is not limited to the embodiment described above and can be changed as appropriate within the scope not departing from the spirit. In the present disclosure, modification of any component of the embodiment or omission of any component of the embodiment is possible.

LIST OF REFERENCE SYMBOLS

1 machine tool
2 numerical control device
21 storage unit
22 corner detection unit
23 first rate-planning unit
24 instruction generation unit
25 second rate-planning unit
26 instruction rate generation unit
27 control unit
201 hardware processor
202 bus
203 ROM
204 RAM
205 nonvolatile memory
206 interface
207 axis control circuit
208 spindle control circuit
209 PLC
210 I/O unit
3 input/output device
4 servo amplifier

5 servo motor
6 spindle amplifier
7 spindle motor
8 auxiliary device

The invention claimed is:

1. A control device comprising:

a corner detection unit that detects, from a machining program, an instruction on a corner part where a direction of machining performed by a tool is changed discontinuously;

a first rate-planning unit that, based on the instruction, generates a deceleration plan defining a feed rate of a control axis when the tool moves toward the corner part and an acceleration plan defining a feed rate of the control axis when the tool moves away from the corner part;

an instruction generation unit that overlaps a deceleration period specified by the deceleration plan and an acceleration period specified by the acceleration plan to generate a curve instruction path representing a motion path of the tool and first instruction rate information indicating a first provisional feed rate of the tool on the curve instruction path;

a second rate-planning unit that generates second instruction rate information indicating a second provisional feed rate of the tool on the curve instruction path so that an acceleration on the curve instruction path generated by the instruction generation unit is less than or equal to a predetermined allowable acceleration; and an instruction rate generation unit that, based on the first instruction rate information and the second instruction rate information, generates third instruction rate information indicating an actual feed rate when the tool actually moves on the curve instruction path, wherein the instruction generation unit overlaps a feed rate in a direction along the control axis in the deceleration period and the feed rate in the direction along the control axis in the acceleration period to generate a combined feed rate in the direction along the control axis and, when it is estimated that at least any one of a combined acceleration and a combined jerk when the tool is moved in the direction along the control axis at the combined feed rate exceeds a reference acceleration and a reference jerk, adjusts a start timing of the acceleration period relative to the deceleration period so that the combined acceleration and the combined jerk in the direction along the control axis do not exceed the reference acceleration and the reference jerk.

2. The control device according to claim 1, wherein the instruction rate generation unit generates the third instruction rate information based on the smaller one of the first provisional feed rate and the second provisional feed rate.

3. The control device according to claim 1, wherein the instruction rate generation unit sets the actual feed rate to be the first provisional feed rate when the first provisional feed rate is less than or equal to the second provisional feed rate, and the instruction rate generation unit sets the actual feed rate to be a rate that is less than the first provisional feed rate and greater than or equal to the second provisional feed rate when the first provisional feed rate is greater than the second provisional feed rate.

4. The control device according to claim 3, wherein when the first provisional feed rate is greater than the second provisional feed rate, the instruction rate generation unit determines the actual feed rate based on the following equation:

$$V3 = K \times V1 + (1 - K) \times V2,$$

where V3 is the actual feed rate, K is an interior division ratio, V1 is the first provisional feed rate, V2 is the second provisional feed rate, and $0 \leq K \leq 1$.

5. The control device according to claim 4, wherein the interior division ratio is reduced as being closer to an intermediate position on the curve instruction path and is increased as being more distant from the intermediate position.

6. The control device according to claim 4, wherein the interior division ratio is a predetermined constant.

7. The control device according to claim 1, wherein the instruction generation unit overlaps the deceleration period and the acceleration period so that a difference between a path indicated by the instruction on the corner part designated by the machining program and the curve instruction path is within a predetermined range.

8. A computer readable storage medium storing an instruction that causes a computer to perform:

detecting, from a machining program, an instruction on a corner part where a direction of machining performed by a tool is changed discontinuously;

based on the instruction, generating a deceleration plan defining a feed rate of a control axis when the tool moves toward the corner part and an acceleration plan defining a feed rate of the control axis when the tool moves away from the corner part;

overlapping a deceleration period specified by the deceleration plan and an acceleration period specified by the acceleration plan to generate a curve instruction path representing a motion path of the tool and first instruction rate information indicating a first provisional feed rate of the tool on the curve instruction path;

generating second instruction rate information indicating a second provisional feed rate of the tool on the curve instruction path so that an acceleration on the generated curve instruction path is less than or equal to a predetermined allowable acceleration; and based on the first instruction rate information and the second instruction rate information, generating third instruction rate information indicating an actual feed rate when the tool actually moves on the curve instruction path, wherein the computer further performs overlapping a feed rate in a direction along the control axis in the deceleration period and the feed rate in the direction along the control axis in the acceleration period to generate a combined feed rate in the direction along the control axis and, when it is estimated that at least any one of a combined acceleration and a combined jerk when the tool is moved in the direction along the control axis at the combined feed rate exceeds a reference acceleration and a reference jerk, adjusts a start timing of the acceleration period relative to the deceleration period so that the combined acceleration and the combined jerk in the direction along the control axis do not exceed the reference acceleration and the reference jerk.

* * * * *